(12) United States Patent
Kashiwase et al.

(10) Patent No.: US 6,352,035 B1
(45) Date of Patent: Mar. 5, 2002

(54) DRIVING MECHANISM OF A TRACK TRAVELING VEHICLE

(75) Inventors: Jiro Kashiwase; Katsuyoshi Aida, both of Tokyo (JP)

(73) Assignee: Nikken Corporation, Tokyo (JP)

( * ) Notice: Subject to any disclaimer, the term of this patent is extended or adjusted under 35 U.S.C. 154(b) by 0 days.

(21) Appl. No.: 09/672,731

(22) Filed: Sep. 28, 2000

(30) Foreign Application Priority Data

Mar. 24, 2000 (JP) ............................................. 12-84808

(51) Int. Cl.[7] ............................................. B61C 11/00
(52) U.S. Cl. .................. 105/72.2; 104/154; 105/215.1; 105/215.2; 74/11; 74/13
(58) Field of Search ........................ 104/154; 105/72.2, 105/215.1, 215.2; 74/11, 13

(56) References Cited

U.S. PATENT DOCUMENTS

| | | | | |
|---|---|---|---|---|
| 2,896,553 A | * | 7/1959 | Whisler | 105/215.1 |
| 3,019,742 A | * | 2/1962 | Kershaw | 105/215.1 |
| 3,516,576 A | * | 6/1970 | Elliott | 222/177 |
| 3,581,671 A | * | 6/1971 | Hart | 105/215.1 |
| 4,355,584 A | * | 10/1982 | White, Jr. | 105/215.1 |
| 4,520,735 A | * | 6/1985 | Field | 105/215.1 |
| 5,103,740 A | * | 4/1992 | Masse | 105/72.2 |
| 5,740,742 A | * | 4/1998 | Bush | 105/72.2 |

FOREIGN PATENT DOCUMENTS

JP  11-189155  7/1999

* cited by examiner

Primary Examiner—S. Joseph Morano
Assistant Examiner—Lars A. Olson
(74) Attorney, Agent, or Firm—Flynn, Thiel, Boutell & Tanis, P.C.

(57) ABSTRACT

A track traveling vehicle having rubber tires for engaging a public road to permit the vehicle to travel thereon, and also having metal wheels capable of engaging rails associated with a track for permitting the vehicle to travel therealong. The metal wheels are supported on the chassis of the vehicle for vertical movement between a raised position wherein the rubber tires engage the road, and a lowered position wherein the metal wheels engage the rails and the rubber tires are maintained in an upwardly suspended non-engaged position. Hydraulic pumps are driven by the rubber tires when they are in the raised suspended position, and the hydraulic pumps supply hydraulic fluid to hydraulic motors to effect driving thereof. The hydraulic motors are in turn drivingly coupled to either the front or rear metal wheels to effect driving thereof when the metal wheels are engaged on the rails so that the vehicle can travel therealong.

12 Claims, 14 Drawing Sheets

DRIVING MECHANISM OF A TRACK TRAVELING VEHICLE

FIELD OF THE INVENTION

The invention relates to a driving mechanism of a track traveling vehicle having rubber tires and iron wheels on its chassis and which is capable of self-propelling on a track of a rail road as well as on a public road, wherein the iron wheels can be turned by a driving force of the rubber tires.

BACKGROUND OF THE INVENTION

In a track provided to allow a street car or train to travel thereon, periodical operations are frequently conducted. There are a variety of operations as periodical operations, such as maintenance and inspection of a trolley line that is constructed over the track in addition to ground operations such as tamping of smashed stones paved on the track or change of tiles. In such operations relating to the track, operators and materials need to be moved to an operating or job site, and most job sites normally have no road or traffic access. In many cases a track traveling vehicle (also known as a land track traveling vehicle) capable of traveling on both a public road and a track is used to move operators or materials to an inconveniently situated job site.

The foregoing track traveling vehicle has a body or chassis of a generally known truck provided with rubber tires as its base, and iron wheels provided under the chassis to travel on a track. The track traveling vehicle travels on a public or normal road by rubber tires so as to move to a railway crossing close to a job site so as to move from a standby location in an urban district area to the job site located in the suburbs and is positioned along the track. If the track traveling vehicle enters the railway crossing, it is lifted by hydraulic jacks or the like to be turned at right angles with the road so as to align the track traveling vehicle with the direction of the track. Thereafter, the iron wheels are lowered to contact the rails while the lower ends of the rubber tires are forced to float in the air. In this state, the track traveling vehicle is held by the respective iron wheels so that the track traveling vehicle is moved along the track when the iron wheels are driven. In the track traveling vehicle capable of travelling on both the public road and the track, it can travel on the public road at high speed until it reaches a railway crossing from a standby location of a maintenance or construction company, and can also travel on rails from the railway crossing to a job site, thereby quickly and efficiently moving operators and materials to the job site.

There have been conventionally employed two types of methods for driving a track traveling vehicle having the foregoing construction on rails. The first method is to lift a chassis by iron wheels while the rubber tires of the truck are maintained in contact with the surfaces of rails. In this method, if the rubber tires are turned to travel on a general public road, a driving force or tuning force of the rubber tires moves the chassis owing to frictional force generated between the rubber tires and the rails. At this time, the iron wheels have the function to merely guide the chassis not to come out from the rails, while the motion of the chassis depends on the frictional force of the rubber tires. In the first method, the rubber tires are forced to contact the rails while keeping an appropriate pressure therebetween, resulting in a difficulty in controlling thereof.

The second method is to lift the entire chassis by the iron wheels while the rubber tires are forced to float in the air, then the iron wheels are driven by hydraulic motors connected to the iron wheels. In this method, the speed (i.e. rpm) and turning direction can be controlled by the amount of a hydraulic oil supplied to the hydraulic motors, resulting in a characteristic of easy driving of the track traveling vehicle. There is conventionally employed two ways for sucking and discharging the hydraulic oil to the hydraulic motors. One way is to apply power from a vehicle battery to electric motors, so that hydraulic pumps are driven by the electric motors to discharge hydraulic oil. This way has, however, a drawback in that a large amount of hydraulic oil is not discharged by the power applied by the battery, and energy consumption in the battery is large. The second way is to connect hydraulic pumps to an engine mounted on the chassis and hydraulic oil is discharged from the hydraulic pumps by the turning force of the engine. In the second way, the tuning or driving force of the engine can be directly transmitted to the hydraulic pumps as it is very efficient, and hence this way is widely employed.

The conventional track traveling vehicle has a mechanism wherein hydraulic pumps are directly connected to an output shaft of an engine, and hydraulic motors are driven by hydraulic oil discharged by the hydraulic pumps, and an output of the hydraulic motors drives or turn the iron wheels. This mechanism has not employed fixed discharge amount hydraulic pumps, but employs variable discharge amount hydraulic pumps (for example as disclosed in Japanese Patent Laid-Open Publication No. 11-189155). These variable discharge amount hydraulic pumps function to control the amount of hydraulic oil that is discharged by controlling a control pressure even if the output of the engine is constant. If variable discharge amount hydraulic pumps are used, the discharge amount of hydraulic oil can be varied by stages from zero to the maximum by controlling a control pressure so that the hydraulic motors, namely, the rpm of the iron wheels can be varied by stages by controlling the amount of discharge of hydraulic oil from the hydraulic pumps. In such a control method, there is an advantage that the rpm of the iron wheels can be varied smoothly from zero to the maximum, and also the controlling operation is easily made to smoothly drive the track traveling vehicle. However, the variable discharge amount hydraulic pumps are expensive in cost and complex in hydraulic system piping for controlling purposes. Further, since the variable discharge amount hydraulic pumps are fixed to the chassis side, and the hydraulic motors for driving the iron wheels are fixed to the rear portion of the chassis, there is a drawback that the length of hydraulic piping for connecting the variable discharge amount hydraulic pumps and the hydraulic motors becomes long because these pumps and the hydraulic motors are connected by a hydraulic hose or the like. Accordingly, the conventional variable discharge amount hydraulic pumps have many drawbacks in view of cost and design thereof although they are excellent in operability.

SUMMARY OF THE INVENTION

The driving mechanism of a track traveling vehicle of the invention is characterized in a construction that hydraulic pumps are driven by rubber tires of a generally known truck that forms a base of the track traveling vehicle, and hydraulic motors are driven by hydraulic oil discharged by the hydraulic pumps. With this construction, a driving force between an engine and a transmission is transmitted to the rubber tires to operate the hydraulic pumps as it is without altering or reforming the driving mechanism of the truck. It is possible to suck and discharge hydraulic oil in the same manner as in an ordinary truck, and the turning output of the engine is changed to effect forward and backward operations or stopping operation. Further, since the driving mechanism of a track traveling vehicle can employ cheaper fixed discharge amount hydraulic pumps without using expensive variable discharge amount hydraulic pumps, the mechanism becomes cheaper in cost.

To achieve the above objects, a driving mechanism of a track traveling vehicle according to a first aspect of the invention capable of traveling on both a road and a track comprises front and rear rubber (i.e. road) tires supported by a chassis at the lower portion thereof, front and rear iron (i.e. track) wheels supported by the chassis and movable vertically, hydraulic pumps and hydraulic motors, wherein the track traveling vehicle travels on the road when the iron wheel are lifted while the front and rear rubber tires are forced to contact the ground, and the track traveling vehicle travels on the track when the front and rear iron wheels are lowered to contact rails while the front and rear rubber tires are forced to float in the air (i.e., in a raised suspended state out of engagement with either the road or track), and wherein the hydraulic pumps are driven by the rear rubber tires so as to suck and discharge hydraulic oil to the hydraulic motors, and the front or rear iron wheels are driven by the hydraulic motors so that the track traveling vehicle travels on the track.

The driving mechanism of a track traveling vehicle according to a second aspect of the invention is characterized in that the driving mechanism of the first aspect of the invention comprises a swing portion fixed to the chassis and arranged to be vertically swung by hydraulic cylinders, friction wheels supported by the swing portion and capable of contacting rear rubber tires at the peripheries thereof when the swing portion is turned, and the hydraulic pumps being driven when the friction wheels are turned.

The driving mechanism of a track traveling vehicle according to a third aspect of the invention is characterized in that the driving mechanism of the first aspect of the invention comprises a swing portion fixed to the chassis and arranged to be vertically swung by hydraulic cylinders, an axle supporting portion fixed to the swing portion at the lower portion thereof, the rear iron wheels supported by the axle supporting portion at both sides thereof, and the hydraulic motors provided on the axle supporting portion for driving the rear iron wheels, wherein the swing portion and the axle supporting portion are turned when the hydraulic cylinders are operated so that the rear iron wheels supported by the axle supporting portion are forced to contact rails to allow the rubber tires to float in the air.

The driving mechanism of a track traveling vehicle according to a fourth aspect of the invention is characterized in that the driving mechanism of the first aspect of the invention comprises a swing portion fixed to the chassis and arranged to be vertically swung by hydraulic cylinders, and an axle supporting portion fixed to the swing portion at the lower portion, wherein the axle supporting portion is connected to the swing portion so as to be vertically laterally swung (i.e. to the left and right).

A driving mechanism of a track traveling vehicle according to a fifth aspect of the invention capable of traveling on both a road and a track, comprising front and rear rubber tires supported by a chassis at the lower portion thereof, front and rear iron wheels supported by the chassis and movable vertically, wherein the track traveling vehicle travels on the road when the iron wheel are lifted while the front and rear rubber tires are forced to contact the ground, and the track traveling vehicle travels on the track when the front and rear iron wheels are lowered to contact rails while the front and rear rubber tires are forced to float in the air, wherein said driving mechanism further comprises hydraulic pumps for driving use that are driven when the rear rubber tires are turned, hydraulic motors that are driven by hydraulic oil discharged by the hydraulic pumps, and a hydraulic pump for oil supply use that is driven when the rear rubber tires are turned, wherein two hydraulic circulation circuits are formed by connecting and closing both hydraulic output ends of the hydraulic pumps for driving use and the hydraulic motors, and wherein a hydraulic output end of the hydraulic pump for oil supply use at the discharge side communicates with the hydraulic circulation circuits, so that two hydraulic pumps are driven at the same time when the rear rubber tires are turned to discharge the hydraulic oil, thereby supplying the hydraulic oil that is discharged from the hydraulic pump for oil supply use to the hydraulic oil circulation circuits.

The driving mechanism of a track traveling vehicle according to a sixth aspect of the invention is characterized in that in the fifth aspect of the invention, the number of hydraulic pumps for driving use is two, and the number of hydraulic motors for turning the rear iron wheels is two, and the number of the hydraulic pump for oil supply use is one, wherein the three hydraulic pumps are operated at the same time when the rear rubber tires are turned, and wherein the hydraulic pumps for driving use are connected to both hydraulic output ends of the hydraulic motors to form two hydraulic circulation circuits, the hydraulic output end of the hydraulic pump for oil supply use at the discharge side communicates with the hydraulic circulation circuits, and wherein hydraulic oil discharged from the hydraulic pump for oil supply use is supplied to the respective independent hydraulic circulation circuits for turning the hydraulic motors.

The driving mechanism of a track traveling vehicle according to a seventh aspect of the invention is characterized in that the hydraulic circulation circuits of the fifth or sixth aspect of the invention are formed by connecting and closing both hydraulic output ends of the hydraulic pumps for driving use and hydraulic motors for turning the rear iron wheels, and a safety circuit is provided between pressure application sides and application collection sides of the hydraulic circulation circuits for leaking hydraulic oil of one hydraulic circulation circuit to the other hydraulic circulation circuit and discharging overflowed hydraulic oil when hydraulic oil exceeds a prescribed value.

The driving mechanism of a track traveling vehicle according to an eighth aspect of the invention is characterized in that in the fifth or sixth aspect of the invention, both hydraulic output ends of the hydraulic pump for oil supply use communicates with an oil tank via check valves directed in a forward direction, and also communicates with the oil tank via relief valves directed in a forward direction, and is further connected to both hydraulic output ends of the hydraulic pumps for driving use via check valves directed in a forward direction.

DETAILED DESCRIPTION OF THE INVENTION

FIRST EMBODIMENT
FIGS. 1 to 8 and 14

A driving mechanism of a track traveling vehicle according to the first embodiment is described with reference to FIGS. 1 to 8 and 14.

Figure 1:
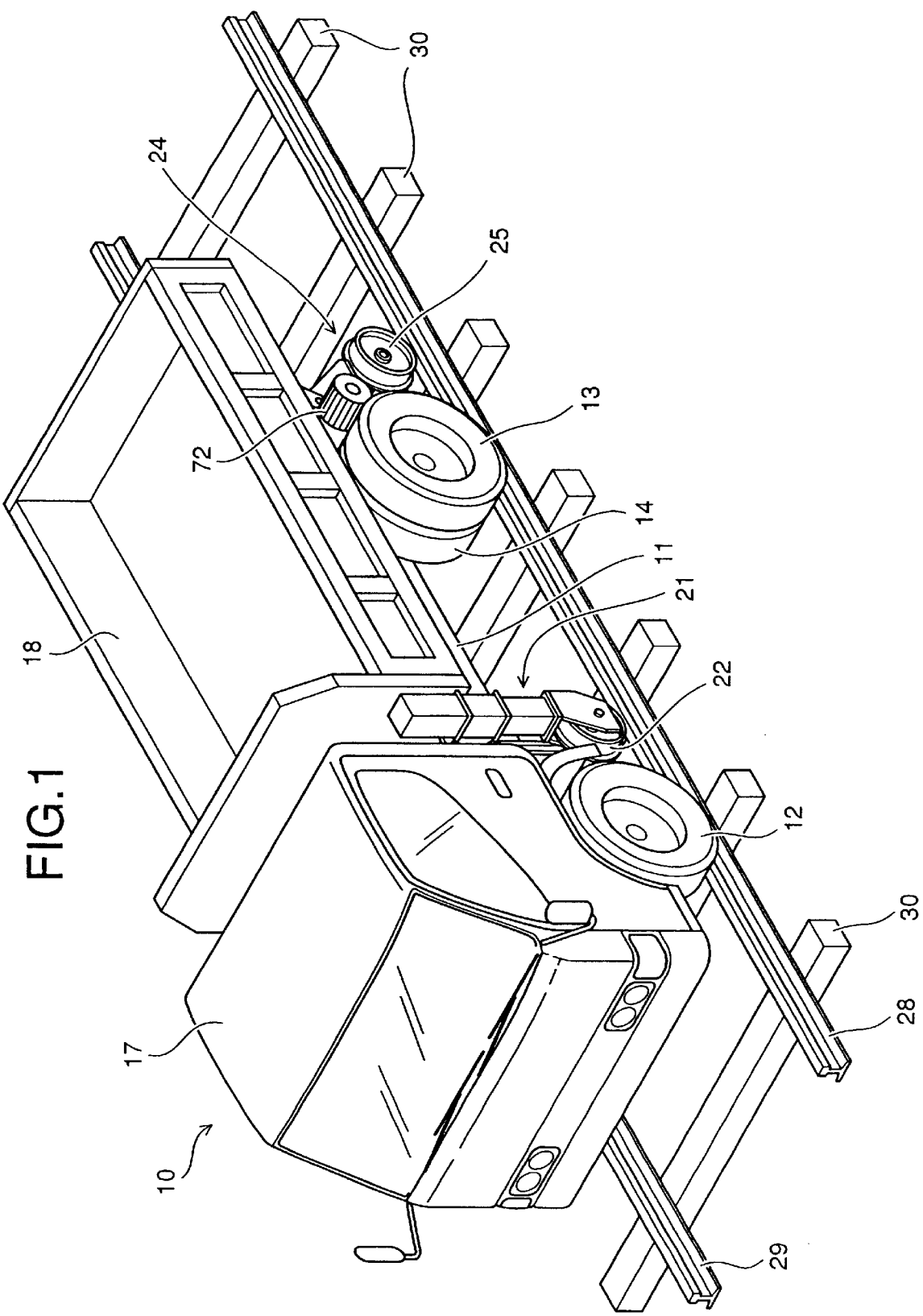
FIG. 1 is a perspective view showing a state where a track traveling vehicle according to a first embodiment of the invention is placed and travels on a track.
Figure 2:
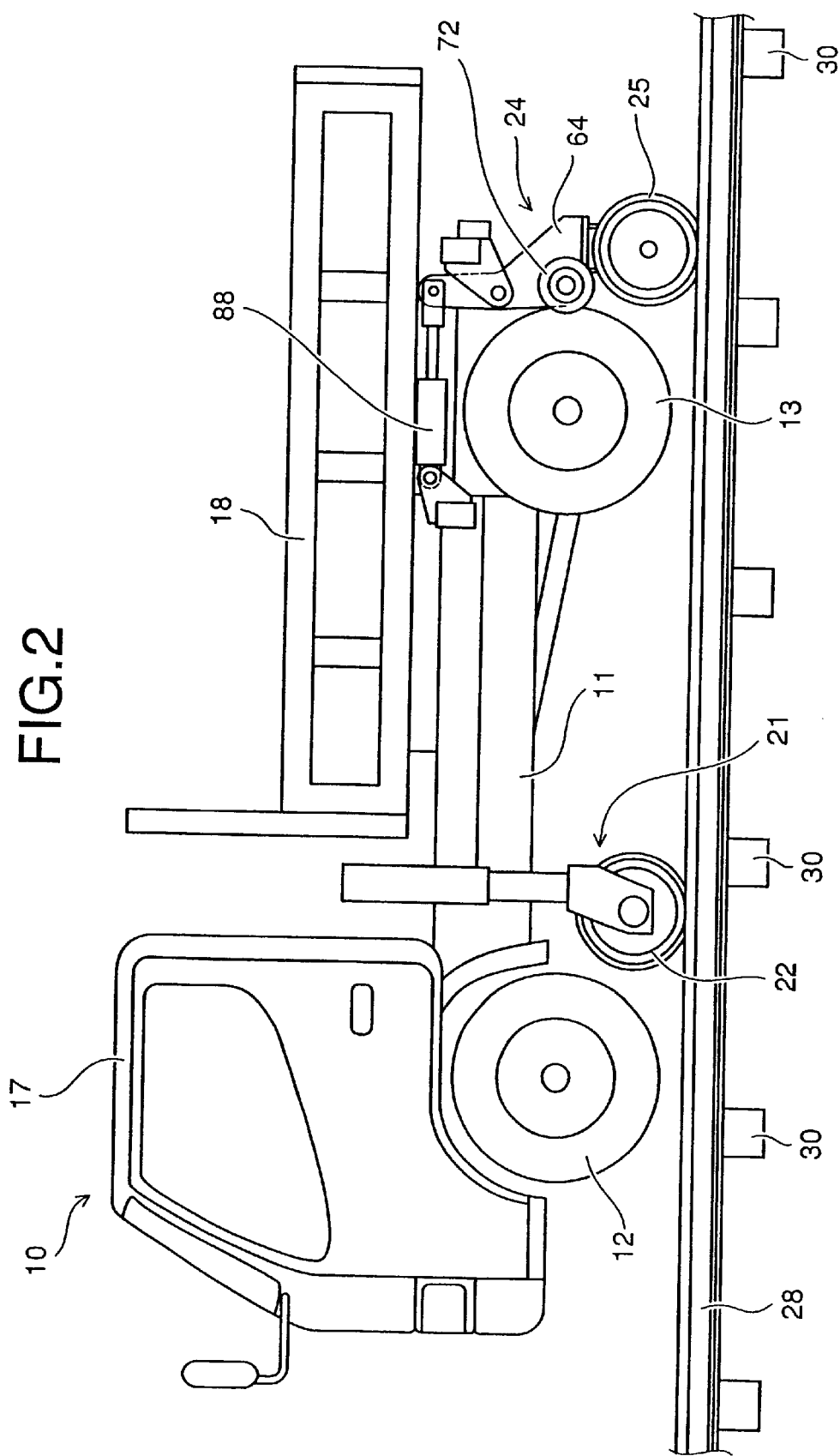
FIG. 2 is a side view of the track traveling vehicle in FIG. 1.
Figure 3:
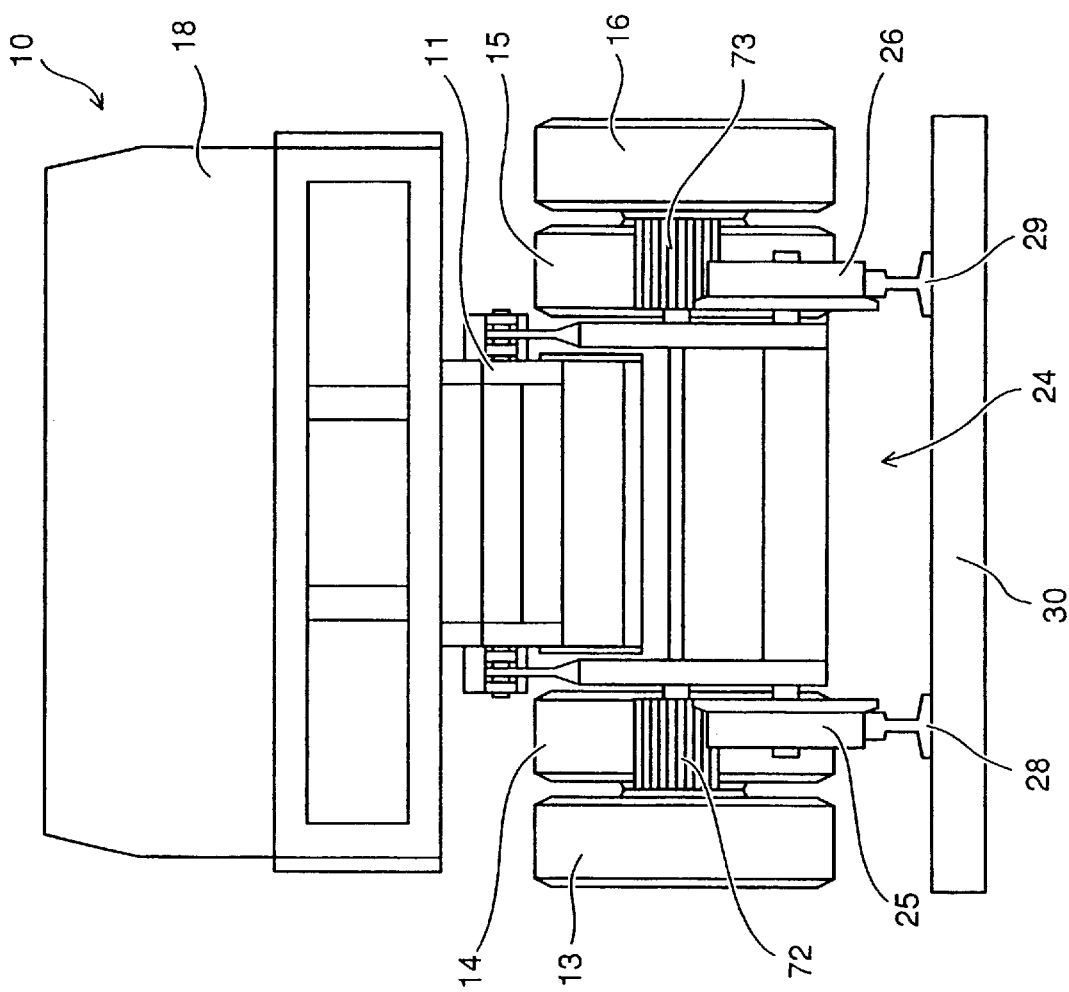
FIG. 3 is a rear view of the track traveling vehicle in FIG. 1.

FIG. 1 is a perspective view of a track traveling vehicle 10 according to a first embodiment of the invention, and it shows a state where the track traveling vehicle 10 is placed and travels on parallel rails 28, 29 provided on a track. FIG. 2 is a side view of the track traveling vehicle 10 in a state where it travels on the track, and FIG. 3 is a rear view of the track traveling vehicle 10 in FIG. 1. In these figures, the track is formed by a pair of rails 28, 29 which are disposed at a given spaced interval, and the rails 28, 29 are fixed onto railroad ties 30 which are disposed in given intervals on broken or smashed stones or the like.

A main body of the track traveling vehicle 10 is a conventional truck provided with an engine, and it represents a body construction of a so-called dump truck. A chassis 11 for supporting the entire track traveling vehicle 10 is formed of a frame prepared by welding channel-shaped steel members. Front rubber road tires 12 are supported by front left and right sides of the chassis 11, and left rear rubber road tires 13, 14, and right rear rubber road tires 15, 16 are respectively supported as double tires by the rear left and right sides thereof. A cabin 17 in which a driver operates the track traveling vehicle 10 is fixed onto the chassis 11 at the front end over the front tires 12. A rear body 18 having a box shape which is loaded with gravel or earth and sand is fixed onto the rear portion of the chassis 11. The constructions of the chassis 11, front tires 12, left rear tires 13, 14, right rear tires 15, 16, cabin 17, and rear body 18 are the same as those of a generally conventionally known truck, whereby the track traveling vehicle 10 is assembled by reforming a conventional, commercially available truck.

Front jack mechanisms 21 are fixed onto the chassis 11 at the left and right sides between the cabin 17 and rear body 18 (only the left side front jack mechanism 21 is shown in FIG. 1 and 2, a right side front jack mechanism 21 opposite to the left side front jack mechanism 21 is not shown in FIGS. 1 and 2 for convenience, but the right side front jack mechanism 21 is symmetrical with the left side front jack mechanism 21). Front iron or metal wheels 22 are supported by the front jack mechanisms 21 at the lower portions thereof. Since the front jack mechanisms 21 have hydraulic cylinders therein, they can be vertically telescoped in the longitudinal direction thereof, thereby vertically moving the front iron wheels 22. When the front iron wheel 22 is lowered by its respective hydraulic cylinder, it can contact the respective rail 28, 29.

A driving mechanism 24 which can be turned by hydraulic cylinders 88, 89 is fixed to the chassis 11 at the rear portion thereof wherein the track traveling vehicle 10 can be moved on the track by the driving mechanism 24. Rear iron or metal wheels 25, 26 are supported by the lower portion of the driving mechanism 24 at the left and right sides, wherein when the driving mechanism 24 is turned by the hydraulic cylinders 88, 89, the rear iron wheel 25 contacts the rail 28 while the rear iron wheel 26 contacts the rail 29, thereby lifting the chassis 11. With the construction, when the track traveling vehicle 10 travels on a public road, the front iron wheels 22 are pulled up by the front jack mechanisms 21 and the rear iron wheels 25, 26 are also pulled up by the driving mechanism 24. As a result, since the front tires 12, left rear tires 13, 14 and right rear tires 15, 16 contact the ground, the output from an engine of the track traveling vehicle 10 is transmitted to the left rear tires 13, 14 and right rear tires 15, 16 so that the entire track traveling vehicle 10 is forced to travel on the public road. When the direction of the track traveling vehicle 10 is turned to different directions, the track traveling vehicle 10 can be moved to an intended direction by operating the front tires 12 to the left and right. Such a function is the same as that of a conventionally known truck.

Next, when the track traveling vehicle 10 is forced to travel on the track, it is driven on a public road until it reaches a railway crossing where the track crosses the public road. Thereafter, the track traveling vehicle 10 is forced to stop at the center of the railway crossing, and a conventional jack-up mechanism (generally fixed to the central lower side of the chassis 11), not shown, is operated to lift the entire track traveling vehicle 10, then the track traveling vehicle 10 is rotated through a right angle. In consequence, the moving direction of the track traveling vehicle 10 becomes parallel with the extension direction of the track. At this position, when the front iron wheels 22 are lowered by the front jack mechanisms 21, the front iron wheels 22 contact the rails 28, 29 while when the driving mechanism 24 is turned, the rear iron wheel 25 contacts the rail 28 and the rear iron wheel 26 contacts the rail 29. Thereafter, when the jack-up mechanism is contracted, the entire chassis 11 is supported by the front iron wheels 22 and rear iron wheels 25, 26 so that the front tires 12, left rear tires 13, 14 and right rear tires 15, 16 are spaced upwardly away from the rails 28, 29. When the engine of the track traveling vehicle 10 is driven in a state where the left rear tires 13, 14 and right rear tires 15, 16 are lifted or hoisted, the driving force of the engine is transmitted to the left rear tires 13, 14 and right rear tires 15, 16. When the driving mechanism 24 is turned, friction wheels 72, 73 supported by the driving mechanism 24 are brought into contact with and pressed against the rear tires 14, 15, so that the rotation or turning of the rear tires 14, 15 is transmitted to the friction wheels 72, 73. When the friction wheels 72, 73 are turned, hydraulic pumps 69, 70, 71 are driven so that they suck hydraulic oil and discharge it to hydraulic motors 98, 99 connected to the rear iron wheels 25, 26 to drive the hydraulic motors 98, 99. When the rear iron wheels 25, 26 are turned by the hydraulic motors 98, 99, the track traveling vehicle 10 can move on the rails 28, 29 serving as the track.

Figure 14:
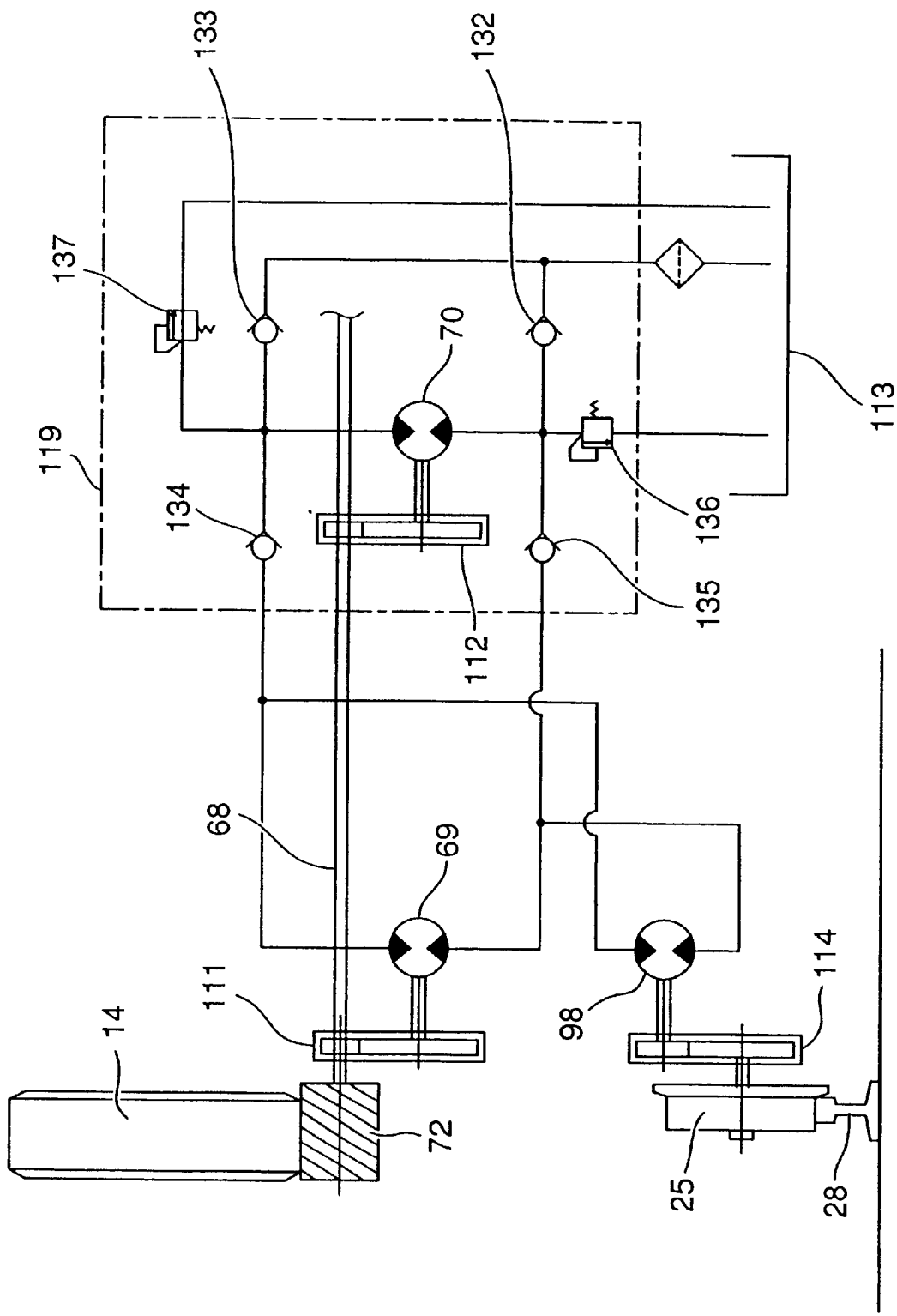
FIG. 14 is a view showing flow of hydraulic oil in the driving mechanism of a track traveling vehicle according to the invention.

The principle for driving the rear iron wheels 25, 26 by the turning of the friction wheels 72, 73 is described with reference to FIG. 14. FIG. 14 shows a summary of a hydraulic system of the driving mechanism of a track traveling vehicle according to the invention. Although the combination of the left rear tire 14 and the friction wheel 72 is shown in FIG. 14, a driving mechanism of the rear iron wheel 26 by the combination of the right rear tire 15 and the friction wheel 73 has the same construction as the combination of left rear tire 14 and friction wheel 72, and hence it is omitted in FIG. 14.

In FIG. 14, the driving mechanism 24 is turned so that the outer periphery of the friction wheel 72 is brought into contact with that of the left rear tire 14. The friction wheel 72 is fixed to a common axle 68 and the common axle 68 is rotatably or turnably supported by the driving mechanism 24. A hydraulic pump 69 is connected to the common axle 68 via a gear box 111. A hydraulic motor 98 is built in the driving mechanism 24, and a turning effort of the hydraulic motor 98 is transmitted to the rear iron wheel 25 via gear box 114. Both hydraulic output ends of the hydraulic pump 69 are connected to both hydraulic output ends of the hydraulic motor 98 wherein the hydraulic pump 69 and the hydraulic motor 98 form a closed circulation circuit. With the construction, when the rear tire 14 is turned, the friction wheel 72 is turned owing to a frictional force, thereby turning the common axle 68 that is turned together with the friction wheel 72, so that the hydraulic pump 69 is driven via the gear box 111. Accordingly, hydraulic oil is discharged from the hydraulic pump 69 and is supplied to the hydraulic motor 98, thereby turning the hydraulic motor 98. The turning or rpm of the hydraulic motor 98 is reduced by the gear box 114 to turn the rear iron wheel 25 so as to generate a motive power for moving the track traveling vehicle 10 on the rail 28. In such a route, the turning effort of the left rear tire 14 is transmitted to the rear iron wheel 25 so that the speed and the forward (or normal) and reversal turning of the rear iron wheel 25 are adjusted by controlling the driving rotation of the left rear tire 14. As a result, the track traveling vehicle 10 can be moved on the rails 28, 29 in the same sense or feeling as the operation of the conventional truck.

An oil supply circuit 119 (FIG. 14) is provided in this hydraulic driving system. The oil supply circuit 119 always supplies hydraulic oil to the closed circuit formed by connecting both hydraulic output ends of the hydraulic pump 69 and those of hydraulic motor 98, thereby preventing the closed circuit from being short of hydraulic oil. The oil supply circuit 119 mainly comprises a hydraulic pump 70 and an oil tank 131 filled with hydraulic oil. The hydraulic pump 70 is connected to the common axle 68 via a gear box 112 so that the hydraulic pump 70 is driven together with the hydraulic pump 69 in the same direction. The oil tank 131 communicates with both hydraulic output ends of the hydraulic pump 70 and both hydraulic output ends of the hydraulic motor 98 via check valves 132, 133 respectively provided in the reverse or backflow direction, while the oil tank 113 also communicate with both hydraulic output ends of the hydraulic pump 70 via relief valves 136, 137. Both hydraulic output ends of the hydraulic pump 69 through which hydraulic oil is sucked and discharged are connected to both hydraulic output ends of the hydraulic pump 70 via check valves 134, 135 provided in the forward direction. That is, the hydraulic oil discharged from the hydraulic pump 70 is always supplied to hydraulic pipes connecting between the hydraulic pump 69 and hydraulic motor 98.

In the oil supply circuit 119, when the common axle 68 is turned by the left rear tire 14, the hydraulic pump 69 is driven via the gear box 111 so that the hydraulic pump 69 sucks the hydraulic oil stored in the oil tank 113. When the hydraulic pump 69 is turned in one direction, the hydraulic oil sucked by the check valve 132 passes through the hydraulic pump 70 and by the check valve 134, then it is supplied to one end of a hydraulic output end (to the side for discharging the hydraulic oil at that time) of the hydraulic pump 69. When the hydraulic pump 69 is reversely turned, the hydraulic oil sucked by the check valve 133 passes through the hydraulic pump 70 and through check valve 135 and is supplied to the other end (to the side for discharging the hydraulic oil at that time, and it is opposite to the forgoing side because the hydraulic pump 69 is reversely turned) of the hydraulic pump 69. Since the hydraulic pressure generated in the hydraulic pump 70 is always applied to the discharge side of the hydraulic pump 69, the closed hydraulic circuits formed by the hydraulic pump 69 and the hydraulic motor 98 are always filled with hydraulic oil. Accordingly, it is possible to prevent a phenomenon of non-transmittance of the driving force caused by a shortage of hydraulic oil, thereby driving the hydraulic motor 98 with assurance. The hydraulic oil which is discharged from the hydraulic pump 70 and not supplied to the hydraulic pump 69, namely, any excess of hydraulic oil, passes through either the relief valve 136 or relief valve 137 and is returned to the oil tank 113.

With such a hydraulic mechanism, when the left rear tire 14 is turned by an engine of the track traveling vehicle 10, the hydraulic pump 69 discharges the hydraulic oil by the turning effort of the left rear tire 14, and the thus discharged hydraulic oil drives the hydraulic motor 98 to turn the rear iron wheel 25 via the gear box 114. At the same time, the hydraulic pump 70 is also driven to supply the hydraulic oil to the closed circuit formed by the hydraulic pump 69 and hydraulic motor 98, thereby preventing the hydraulic pump 69 from being idly turned. The hydraulic mechanism is not directly connected to the engine of the track traveling vehicle 10, and the rear iron wheel 25 is turned by the driving force of the left rear tire 14, thereby achieving a cheaper mechanism because expensive variable discharge amount hydraulic pumps are not used. Since the hydraulic mechanism can be constructed separately from the truck, it is not necessary to reform or rebuild the truck to a large extent so that it can be easily assembled.

Figure 4:
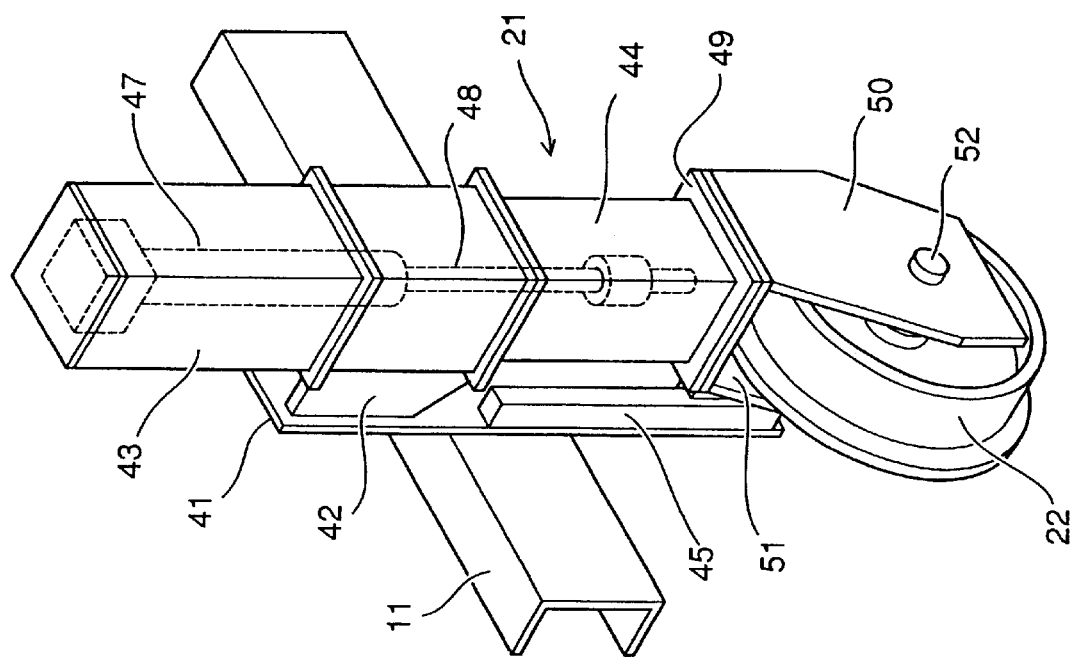
FIG. 4 is an enlarged perspective view of one of front jack mechanisms for vertically moving a front iron wheel of the track traveling vehicle according to the first embodiment of the invention as viewed from a slanting front side thereof.
Figure 5:
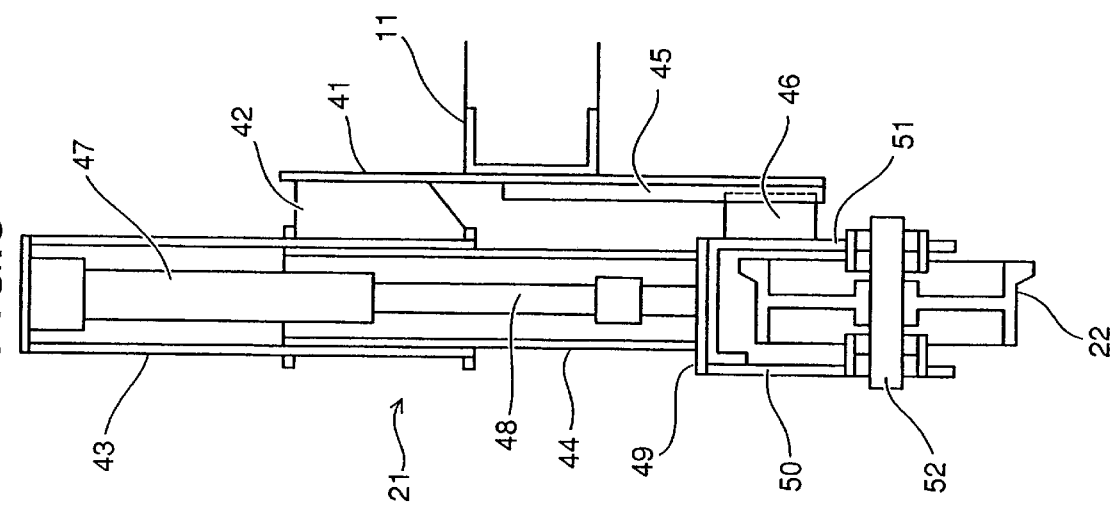
FIG. 5 is a sectional view of the front jack mechanism shown in FIG. 4 cut in a longitudinal direction.

FIGS. 4 and 5 describe the front jack mechanism 21 more in detail, wherein FIG. 4 is the perspective view of the front jack mechanism 21 and FIG. 5 is a sectional view of the front jack mechanism 21 which is cut in the longitudinal direction.

The front jack mechanism 21 is assembled as one unit and each front iron wheel 22 is supported by the front jack mechanism 21 at the lower portion thereof, whereby the front iron wheel 22 can be vertically moved relative to the chassis 11. A long flat attachment plate 41 is fixed in the vertical direction to the outer surface of the chassis 11 formed by a channel-shaped steel member. An attachment plate 42 is fixed to the side surface of the attachment plate 41 at the upper portion thereof in the outward direction, and an outer upright tube 43 is fixed to the attachment plate 42. The outer tube 43 is a square box-shape in cross section, and is closed at the upper end while opened at the lower end. The outer tube 43 is fixed to the attachment plate 42 in the manner that an axial line thereof is perpendicular to the chassis 11. An inner tube 44 is vertically slidably inserted into the outer tube 43 from the lower end opening thereof. The inner tube 44 has a square shape in cross section. A closing plate 49 formed by a square thin plate is brought into intimate contact with and closes the lower end opening of the inner tube 44.

A fluid pressure (i.e. hydraulic) cylinder 47 is housed in the rectangular parallelepiped inner space formed by the outer tube 43 and inner tube 44. The base portion of the hydraulic cylinder 47 is fixed to a ceiling plate of the outer tube 43, and the longitudinal direction of the hydraulic cylinder 47 is aligned with that of the outer tube 43. A cylinder rod 48 telescopically protrudes from the lower end of the hydraulic cylinder 47, and the lower end of the cylinder rod 48 is connected to the upper surface of the closing plate 49. When hydraulic oil is supplied to the hydraulic cylinder 47, the cylinder rod 48 is vertically telescoped, and the closing plate 49 connected to the cylinder rod 48 is vertically moved so that the inner tube 44 is also vertically moved. As a result, the inner tube 44 is vertically slid from the lower end opening of the outer tube 43 to perform a telescopic operation. A pair of axle supporting plates 50, 51 are fixed to the left and right sides of the closing plate 49 and arranged in parallel with each other, and they are directed downward. The front iron wheel 22 is inserted between the axle supporting plates 50, 51 and turnably supported by an axle shaft 52 that is inserted between the axle supporting plates 50, 51 in a lateral direction. A slider 46 is fixed to the side surface of the axle supporting plate 51 in the direction of the chassis 11 and it is slidably engaged with a guide plate 45 that is fixed to the side surface of the attachment plate 41 in the vertical direction. Accordingly, the slider 46 is slid by the guide plate 45 and guided only vertically.

Since the front jack mechanism 21 has such a construction, when the hydraulic oil is supplied to the hydraulic cylinder 47, the cylinder rod 48 telescopes vertically, thereby moving the inner tube 44, closing plate 49, axle supporting plates 50, 51 respectively vertically. As a result, when the front iron wheel 22 is moved vertically, the lower end of the front iron wheel 22 is moved downwardly into contact with the rail 28 or moved upwardly away from the rail 28.

Figure 6:
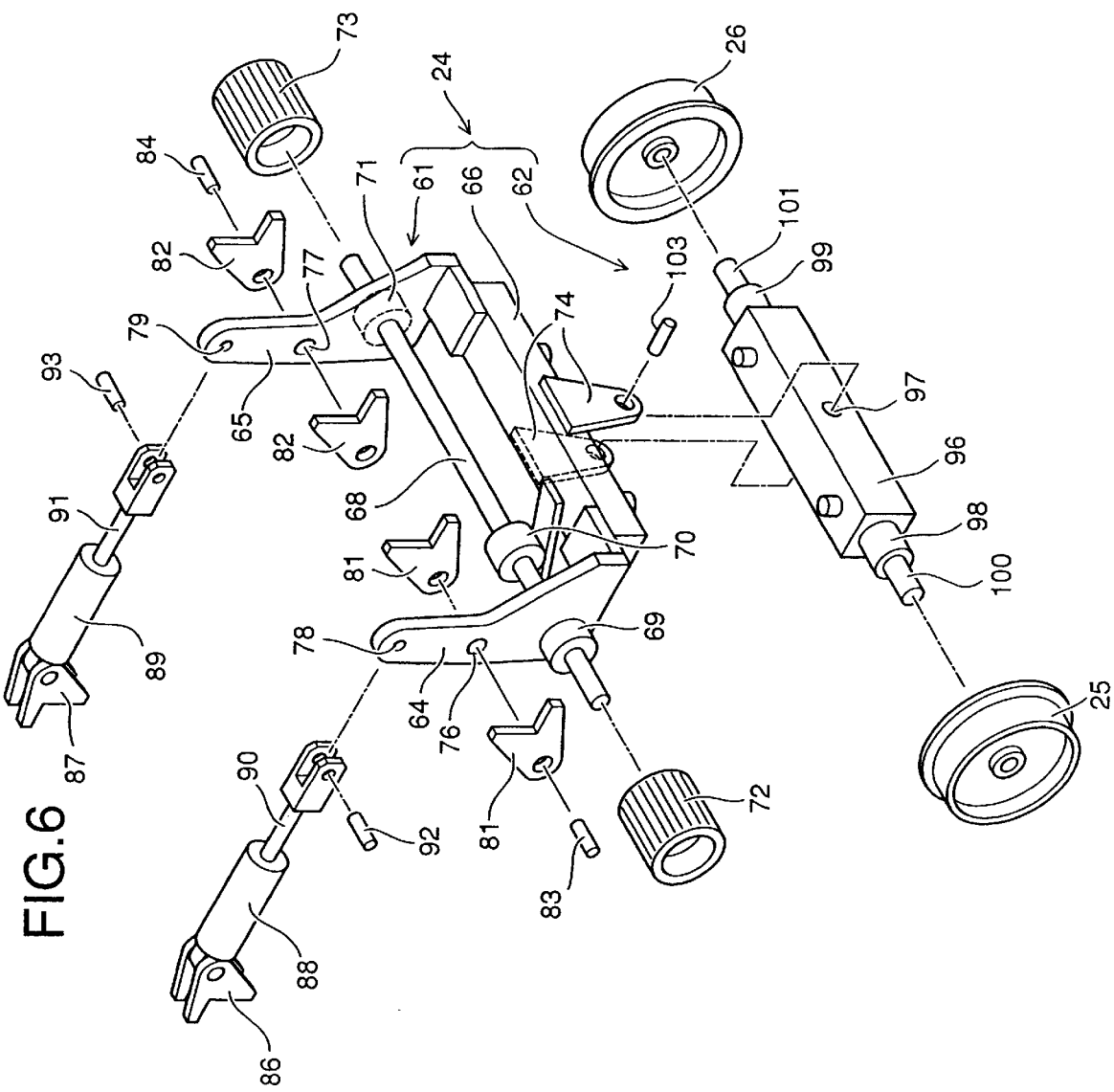
FIG. 6 is an exploded perspective view of parts of a driving mechanism of a track travelling vehicle for vertically moving rear iron wheels and transmitting a rotating force or a turning effort of the rear tires to the rear iron wheels.
Figure 7:
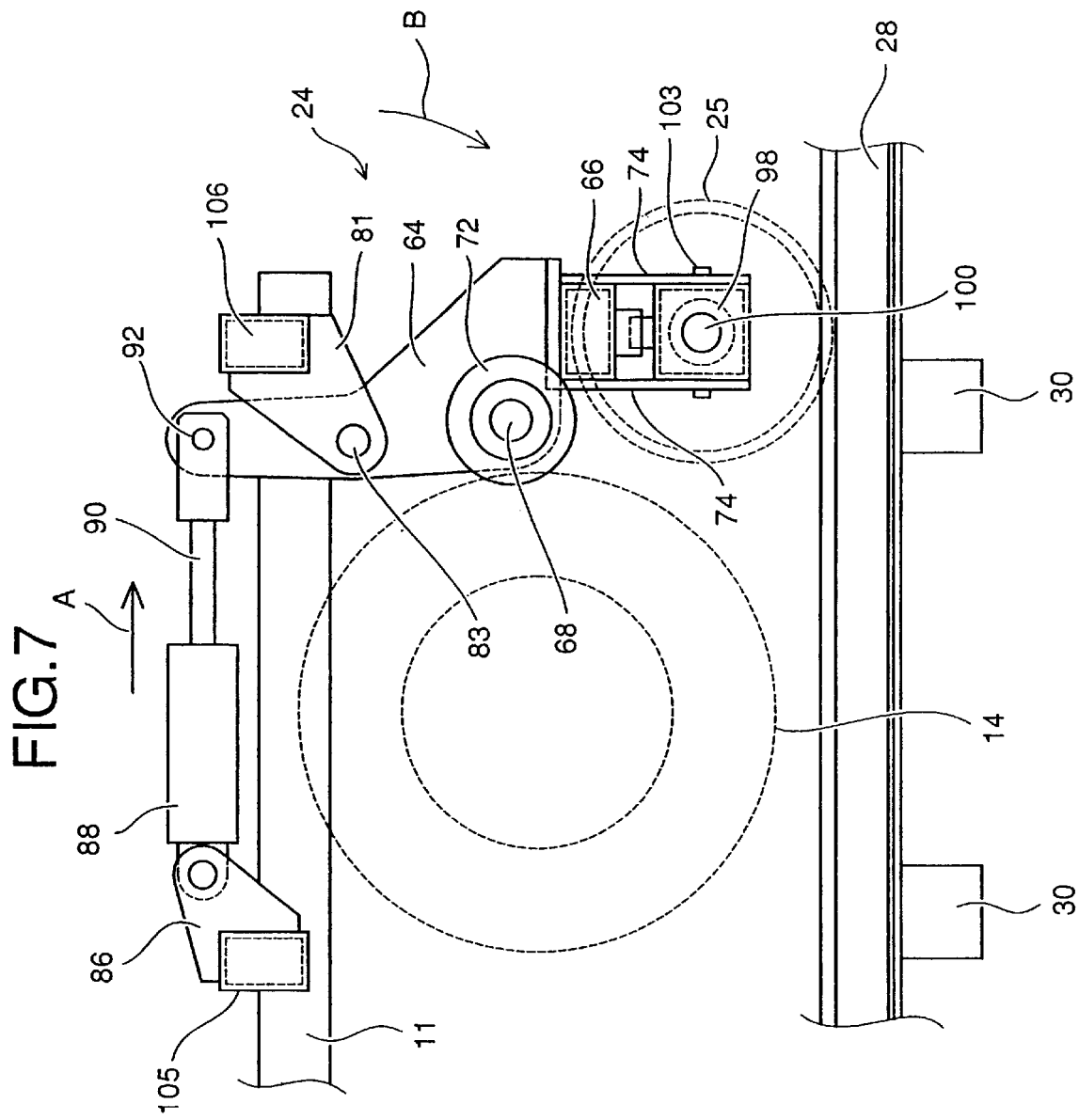
FIG. 7 is a side elevational view of the driving mechanism of a track travelling vehicle according to the first embodiment of the invention for vertically moving rear iron wheels and transmitting a turning effort of the rear tires to the rear iron wheels.

FIGS. 6 and 7 describe the driving mechanism 24 more in detail wherein FIG. 6 is an exploded perspective view of disassembled parts of the driving mechanism 24, and FIG. 7 is a side view showing a state where the parts shown in FIG. 6 are assembled and fixed to the rear portion of the chassis 11. The driving mechanism 24 is formed of one driving unit and it is assembled so as to be fixed to the track traveling vehicle 10 even if a conventional truck is not reformed to a large extent. The track traveling vehicle 10 can be moved back and forth on the rails 28, 29 by the driving mechanism 24 serving as a main constituent of the invention. The driving mechanism 24 mainly comprises a swing portion 61 and an axle portion 62. The swing portion 61 is vertically swingably connected to the rear portion of the chassis 11 while the axle portion 62 is laterally swingably connected to the lower portion of the swing portion 61.

The swing portion 61 comprises a pair of operating or end plates 64, 65 and a connecting body 66 forming a construction that is opened in a U-shape directed upwardly. The end plates 64, 65 and connecting body 66 can be fixed to the chassis 11 at the rear portion as a unit. The end plates 64, 65 are formed by cutting steel plates and have respectively a substantially L-shape as viewed from the side thereof, and they have respectively a triangle between the center of the long side and tip ends of the short side. The end plates 64, 65 are respectively arranged in the manner that each long side thereof is substantially directed vertically while each short side is substantially directed horizontally. Subsequently, the connecting body 66 is formed of a channel member that is square in cross section and hollow in the internal thereof. The connecting body 66 is disposed horizontally and the lower surfaces of the end plates 64, 65 at the short side thereof are connected to both ends of the connecting body 66. A pair of axle supporting plates 74 which extend downward and confront one another are fixed to the central opposite sides of the connecting body 66. The U-shaped construction of the entire swing portion 61 is formed by this construction, and various members are fixed to this U-shaped construction.

The common axle 68 is rotatably supported by substantially L-shaped corner portions of the end plates 64, 65. The common axle 68 and the connecting body 66 are arranged in the manner that the axial line of the common axle 68 is in parallel with the longitudinal direction of the connecting body 66, and both ends of the common axle 68 protrude outward from the end plates 64, 65. The hydraulic pumps 69, 70, 71 are disposed on the periphery of the common axle 68 wherein the hydraulic pump 69 is fixed to the end plate 64 at the outer side thereof while the hydraulic pump 71 is fixed to the end plate 65 at the outer side thereof and the hydraulic pump 70 is fixed between end plates 64, 65. The friction wheels 72, 73 are fixed to the opposite ends of the common axle 68 wherein the friction wheel 72 is forced to contact the left rear tire 14 while the friction wheel 73 is forced to contact the right rear tire 15. The upper end of the end plate 64 at the long side is perforated to form a pin hole 78 while the upper end of the end plate 65 at the long side is perforated to form a pin hole 79. The middle portion of the end plate 64 at the long side is perforated to form an axle hole 76 while the middle portion of the end plate 65 is perforated to form an axle hole 77.

Fixed axle plates 81, 82 are respectively fixed to the chassis 11 to rotatably support the swing portion 61, and they have respectively a configuration of a notchlike claw of a crab that is opened at right angles as viewed from the side surface thereof. The fixed axle plates 81, 82 are respectively perforated at the base thereof to form holes through which pins 83, 84 are inserted. The pair of fixed axle plates 81, 81 are provided in the vicinity of both side surfaces of the end plate 64 whereby the end plate 64 is turnably supported by the pin 83 when the pin 83 is inserted into the holes of the fixed axle plates 81 and the axle hole 76 of the end plate 64. Likewise, the pair of fixed axle plates 82, 82 are provided in the vicinity of both side surfaces of the end plate 65 whereby the end plate 65 is turnably supported by the pin 84 when the pin 84 is inserted into the holes of the fixed axle plates 82 and the axle hole 77 of the end plate 65.

The pair of pressure (i.e. hydraulic) cylinders 88, 89 are respectively held horizontally by the chassis 11 at the side surfaces thereof whereat the two end plates 64, 65 are vertically swung by the hydraulic pressure generated by the hydraulic cylinders 88, 89. A fixed axle plate 86 is connected to the base portion of the hydraulic cylinder 88 by a pin and it has a configuration of a notchlike claw of a crab that is opened at right angles as viewed from the side surface and it is fixed to the chassis 11. Likewise, a fixed axle plate 87 is connected to the base portion of the hydraulic cylinder 89 by a pin and it has a configuration of a notchlike claw of a crab that is opened at right angles as viewed from the side surface, and it is fixed to the chassis 11. A cylinder rod 90 is telescopically inserted into the tip end of the hydraulic cylinder 88, and a fixed metal fitting attached to the tip end of the cylinder rod 90 can engage with the upper end of the end plate 64 at the long side. When a pin 92 is inserted through the fixed metal fitting of the cylinder rod 90 and the pin hole 78 of the end plate 64, the cylinder rod 90 and end plate 64 are pivotally connected to each other. Likewise, a cylinder rod 91 is telescopically inserted into the tip end of the hydraulic cylinder 89, and a fixed metal fitting attached to the tip end of the cylinder rod 91 can engage with the upper end of the end plate 65 at the long side. When a pin 93 is inserted through the fixed metal fitting of the cylinder rod 91 and the pin hole 79 of the end plate 65, the cylinder rod 91 and end plate 65 are pivotally connected to each other.

The axle portion 62 is connected to the lower portion of the swing portion 61 and has the rear iron wheels 25, 26 respectively supported at the left and right sides thereof. A main constituent of the axle portion 62 is a long rectangular parallelepiped axle supporting portion 96 that is square in cross section, and the length of the axle supporting portion 96 is substantially the same as the length of the connecting body 66. The central side surface of the axle supporting portion 96 is perforated to form a pin hole 97 in the horizontal direction, and the axle supporting portion 96 is disposed between the pair of axle supporting plates 74, 74. A pin 103 is inserted into the rear axle supporting plates 74, 74 and the pin hole 97 so that the axle supporting portion 96 is laterally swingably held between the pair of axle supporting plates 74, 74. The hydraulic motor 98 is fixed to one end of the axle supporting portion 96 and a driving shaft 100 protrudes from the hydraulic motor 98. The rear iron wheel 25 is fixed to the driving shaft 100. The hydraulic motor 99 is fixed to the other end of the axle supporting portion 96 and a driving shaft 101 protrudes from the hydraulic motor 99. The rear iron wheel 26 is fixed to the driving shaft 101. The driving shafts 100, 101 are arranged in the manner that their axle lines are aligned. With such a construction, the axle portion 62 is laterally swingably relative to the swing portion 61 so as to swing the rear iron wheels 25, 26 that are supported by the axle portion 62 at the left and right sides thereof while keeping the axial lines between the rear iron wheels 25, 26 aligned. Accordingly, even if there occurs a distortion or variation in heights between the rails 28, 29 or a distortion in the chassis 11 of the track traveling vehicle 10, it is possible to always maintain the rear iron wheels 25, 26 in contact with the rails 28, 29.

FIG. 7 is a side view showing a state where the driving mechanism 24 is assembled as a unit by each component illustrated in the exploded view of FIG. 6 and is fixed to the rear portion of the chassis 11. Lateral channels 105, 106 each having a square pipe shape are fixed to the chassis 11 at the side surface thereof and positioned in front of and behind the left rear tire 14 in the lateral direction so as to protrude therefrom. The notched portion of the fixed axle plate 86 is brought into intimate contact with the upper and rear side surfaces of the lateral channel 105 while the notched portion of the fixed axle plate 81 is brought into intimate contact with the front side and lower surface of the lateral channel 106. When the fixed axle plate 86 is fixed to the lateral channel 105, the base portion of the hydraulic cylinder 88 is connected to the chassis 11. When the fixed axle plate 81 is fixed to the lateral channel 106, the fixed axle plate 81 is disposed aslant in the direction of the left rear tire 14, and hence the end plate 64 connected to the fixed axle plate 81 by the pin 83 is turnably suspended between the lateral channel 106 and left rear tire 14. When hydraulic oil is supplied to the hydraulic cylinder 88, the cylinder rod 90 telescopes, and the operation force of the cylinder rod 90 is transmitted to the end plate 64 via the pin 92 so that the end plate 64 is turned about the pin 83.

When hydraulic oil is supplied to the hydraulic cylinder 88, the cylinder rod 90 is extended in the direction A in FIG. 7, so that the motion of the cylinder rod 90 in the direction A is transmitted to the end plate 64 via the pin 83, thereby tuning the end plate 64 in the direction B in FIG. 7. Since the common axle 68 is supported by the end plate 64 and the friction wheel 72 is fixed to the common axle 68, the outer periphery of the friction wheel 72 is brought into intimate contact with left rear tire 14 when the end plate 64 is turned in the direction B. Although the state where the friction wheel 72 is brought into intimate contact with the left rear tire 14 is illustrated in FIG. 7, this state is also illustrated in FIGS. 2 and 3. When the end plate 64 is turned about the pin 83 in the direction B, the connecting body 66 is also swung downward so that the axle supporting portion 96 moves downward. In consequence, the rear iron wheel 25 supported by the axle supporting portion 96 is pressed downward from the position where it is forced to float in the air, then it is brought into intimate contact with the rail 28. When the rear iron wheel 25 is pressed downward, the left rear tire 14 is lifted from the ground and is suspended in a state where it is forced to float in the air. In these steps, the track traveling vehicle 10 is changed from a state it travels on a public road to a state where it moves on the rail 28.

Figure 8:
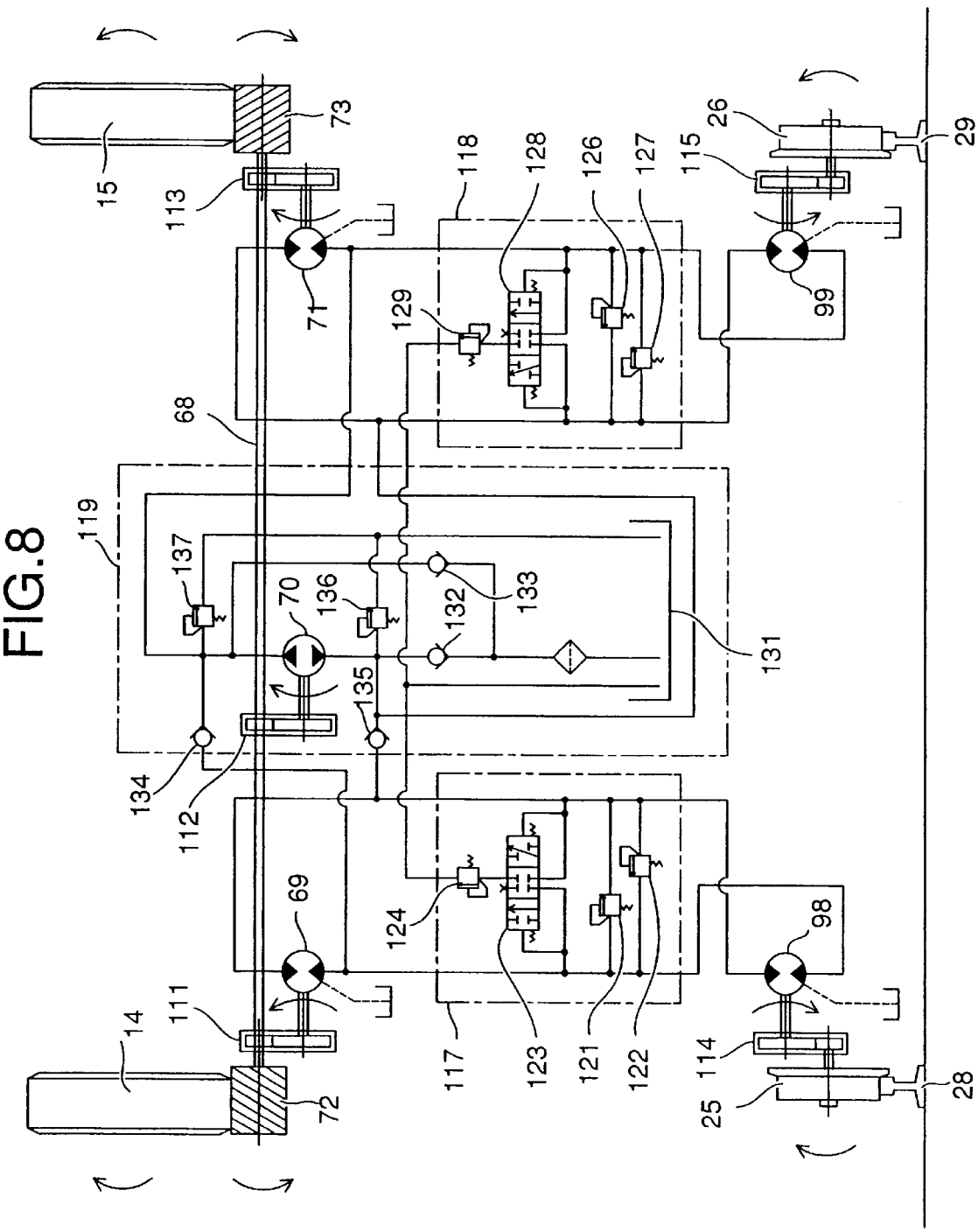
FIG. 8 is a hydraulic circuit showing generation of a hydraulic pressure and flow paths of hydraulic oil for turning the rear iron wheels in the driving mechanism of a track traveling vehicle according to the first embodiment of the invention.

FIG. 8 shows a more detailed construction of a hydraulic circuit of the hydraulic system in the driving mechanism of track traveling vehicle 10 according to the first embodiment of the invention. When the track traveling vehicle 10 travels on rails 28, 29, the friction wheel 72 is brought into intimate contact with the left rear tire 14 while the friction wheel 73 is brought into intimate contact with the right rear tire 15. When the left and right rear tires 14, 15 are turned, the friction wheels 72, 73 are also turned, and hence the turning effort of the friction wheels 72, 73 is transmitted to the common axle 68. Since gear boxes 111, 112, 113 each having gears inside thereof are connected to both ends and center of the common axle 68, wherein the turning effort that is reduced by the gears of the gear box 111 is transmitted to the hydraulic pump 69, while the turning effort that is reduced by the gears of the gear box 112 is transmitted to friction hydraulic pump 70 and the turning effort that is reduced by the gears of the gear box 113 is transmitted to the hydraulic pump 71. When the common axle 68 is turned, the hydraulic pumps 69, 70, 71 discharge hydraulic oil at the same time. A gear box 114 having gears therein is connected to an output of the hydraulic motor 98 and the rear iron wheel 25 is connected to an output of the gear box 114. When the hydraulic oil is supplied to the hydraulic motor 98, the turning effort outputted by the hydraulic motor 98 drives the rear iron wheel 25 via the gear box 114. A gear box 115 having gears therein is connected to an output of the hydraulic motor 99 and the rear iron wheel 26 is connected to an output of the gear box 115. When hydraulic oil is supplied to the hydraulic motor 99, the turning effort outputted by the hydraulic motor 99 drives the rear iron wheel 26 via the gear box 115.

Both hydraulic output ends of the hydraulic pump 69 are connected to hydraulic input ends of the hydraulic motor 98, and hence closed circulation circuits are formed by the hydraulic pump 69 and hydraulic motor 98. Accordingly, the output of hydraulic oil from the hydraulic pump 69 is directly transmitted to the hydraulic motor 98 so that the hydraulic motor 98 is always driven while interlocked with the motion of the hydraulic pump 69. Likewise, both hydraulic output ends of the hydraulic pump 71 are connected to hydraulic input ends of the hydraulic motor 99, and hence closed circulation circuits are formed by the hydraulic pump 71 and hydraulic motor 99. Accordingly, the output of hydraulic oil from the hydraulic pump 71 is directly transmitted to the hydraulic motor 99 so that the hydraulic motor 99 is always driven while interlocked with the motion of the hydraulic pump 71.

A safety circuit 117 is interposed in the circulation circuits of the hydraulic pump 69 and hydraulic motor 98 for preventing hydraulic pressure in the closed circulation circuits from extraordinarily increasing. The safety circuit 117 comprises relief valves 121, 122, 124 and a flushing valve 123. The relief valves 121, 122 are interposed in a pair of oil paths formed by connecting both hydraulic output ends of the hydraulic pump 69 and hydraulic motor 98 in the manner that the operating directions of the relief valves 121, 122 are opposite one another and the neutral position of the flushing valve 123 is connected to the pair of oil paths. Both hydraulic output ends of the hydraulic pump 69 are connected to control ports provided at both ends of the flushing valve 123. The relief valve 124 is connected to one output port of the flushing valve 123 at the neutral position thereof, and an oil tank 131, described later, communicates with the relief valve 124.

A safety circuit 118 is interposed in the circulation circuits formed by the hydraulic pump 71 and hydraulic motor 99 for preventing hydraulic pressure in the closed circulation circuits from extraordinarily increasing. The safety circuit 118 comprises relief valve 126, 127, 129 and a flushing valve 128. The relief valves 126, 127 are interposed in a pair of oil paths formed by connecting both hydraulic output ends of the hydraulic pump 71 and hydraulic motor 99 in the manner that the operating directions of the relief valves 126, 127 are opposite one another, and the neutral position of the flushing valve 128 is connected to the pair of oil paths. Both hydraulic output ends of the hydraulic pump 71 are connected to control ports provided at both ends of the flushing valve 128. The relief valve 129 is connected to one output port of the flushing valve 128 at the neutral position thereof, and the oil tank 131, described later, communicates with relief valve 129.

The oil supply circuit 119 is formed separately from the pair of driving closed circulation circuits of the hydraulic pump 69 and hydraulic pump 71. The oil supply circuit 119 comprises the hydraulic pump 70 having a function to supply hydraulic oil to the pair of circulation circuits so as to prevent each circulation circuit from being short of hydraulic oil. Check valves 132, 133 which are respectively directed in the forward direction are connected to both hydraulic output ends of the hydraulic pump 70. The check valves 132, 133 communicate with the oil tank 131. Relief valves 136, 137 are connected to both hydraulic output ends of the hydraulic pump 70 so as to be in parallel with the check valves 132, 133, and they communicate with the oil tank 131. One end of the hydraulic output ends of the hydraulic pump 70 is connected to one end of a hydraulic output ends of the hydraulic pump 69 via the check valve 134 that is directed in the forward direction while one end of the hydraulic output ends of the hydraulic pump 70 is also connected to one end of the hydraulic output ends of the hydraulic pump 71 via the check valve 138 that is directed in the forward direction. The other end of the hydraulic output ends of the hydraulic pump 70 is connected to the other end of the hydraulic output ends of the hydraulic pump 69 via the check valve 135 that is directed in the forward direction while the other end of the hydraulic output ends of the hydraulic pump 70 is also connected to the other end of the hydraulic output ends of the hydraulic pump 71 via the check valve 139 that is directed in the forward direction.

The operation of the driving mechanism of a track traveling vehicle according to the first embodiment of the invention is briefly described hereinafter.

When the track traveling vehicle 10 is forced to travel on a general public road, hydraulic oil is supplied to each hydraulic cylinder 47 so that the cylinder rod 48 is pulled into the hydraulic cylinder 47. Then the cylinder rod 48 is pulled upward so that the inner tube 44 connected to the cylinder rod 48 is accommodated into the outer tube 43 and contracted. As a result, the front iron wheels 22 are lifted upward from the rails 28, 29 and the front tires 12 contact the ground. Further, hydraulic pressure is applied to the hydraulic cylinders 88, 89 so that the cylinder rods 90, 91 are pulled into the hydraulic cylinders 88, 89. The end plates 64, 65 are turned about the pins 83, 84 so as to be lifted upward via the pins 92, 93 respectively connected to the tip ends of the cylinder rods 90, 91. As the result, the rear iron wheels 25, 26 are lifted upward away from the ground to a height so that the rear tires 13, 14, 15, 16 contact the ground. In such a manner, the track traveling vehicle 10 can travel on a public road when the rear tires 13, 14, 15, 16 are driven by the vehicle engine.

Subsequently, when the track traveling vehicle 10 is forced to travel on the track, hydraulic oil is supplied to each hydraulic cylinder 47 to extend the cylinder rod 48 so that the inner tube 44 is pressed downward from the outer tube 43. Since the front iron wheel 22 supported by the lower portion of the inner tube 44 is also pressed downward, the front iron wheels 22 contact the rails 28, 29 to lift the chassis 11. At the same time, the front tires 29 are lifted upward from the ground, so that the front side of the track traveling vehicle 10 is supported by the front iron wheels 22. Further, when hydraulic oil is supplied to the hydraulic cylinders 88, 89, the cylinder rods 90, 91 are extended in the direction A in FIG. 7. Accordingly, the end plates 64, 65 are turned about the pins 83, 84 in the direction B in FIG. 7 so that the axle supporting portion 96 is pressed downward while the rear iron wheels 25, 26 that have been in a raised position are pressed downward. The rear iron wheel 25 contacts the rail 28 and the rear iron wheel 26 contacts the rail 29 to lift the chassis 11 so that the rear tires 13, 14, 15, 16 are forced to float in the air, and the rear portion of the chassis 11 is supported by the rear iron wheels 25, 26. At the same time, as the end plates 64, 65 are turned in the direction B in FIG. 7, the friction wheel 72 is brought into intimate contact with the left rear tire 14. When the friction wheel 73 is brought into intimate contact with the left rear tire 15, a tuning effort of the left rear tire 15 is transmitted to the friction wheel 73.

Inasmuch as the front iron wheels 22 and rear iron wheels 25, 26 contact the rails 28, 29 as set forth above, the front tires 12 and the rear tires 13, 14, 15, 16 are forced to float in the air, and the track traveling vehicle 10 travels on the track in this state.

The traveling function is described next. Since the friction wheel 72 contacts the left rear tire 14 and the friction wheel 73 contacts the right rear tire 15, the rear tires 14, 15 are turned when an engine in the track traveling vehicle 10 is driven, and the turning effort of the rear tires 14, 15 drives the friction wheels 72, 73 so as to turn the common axle 68. The tuning effort of the common axle 68 drives the hydraulic pump 69 via the gear box 111, the hydraulic pump 71 via the gear box 113, and the hydraulic pump 70 via the gear box 112. The hydraulic pumps 69, 70, 71 discharge hydraulic oil and circulate the hydraulic oil in their respective hydraulic circuits.

The hydraulic oil discharged from the hydraulic pump 69 is supplied to the hydraulic motor 98 so that the hydraulic motor 98 is driven to output a turning effort. This turning effort of the hydraulic motor 98 turns the rear iron wheel 25 via the gear box 114. The hydraulic oil discharged from the hydraulic pump 71 is supplied to the hydraulic motor hydraulic motor 99 so that the hydraulic motor 99 is driven to output a turning effort. This turning effort turns the rear iron wheel 26 via the gear box 115. When these rear iron wheels 25, 26 are turned, the track traveling vehicle 10 can move on the rails 28, 29. If the pressure in the closed circuits formed by the hydraulic pump 69 and hydraulic motor 98 becomes extraordinarily high when the hydraulic oil is circulated, either the relief valve 121 or relief valve 122 is opened to allow the hydraulic oil to flow through the other oil path to prevent the pressure from extraordinarily increasing. Further, if the amount of the hydraulic oil increases in the closed circuits, the hydraulic oil is supplied to a pilot side of the flushing valve 123 to switch the flushing valve 123 so that the hydraulic oil is supplied in the direction of the relief valve 124, and the surplus hydraulic oil is returned to the oil tank 131. Likewise, even if the pressure in the closed circuits formed by the hydraulic pump 71 and hydraulic motor 99 becomes extraordinarily high, either a relief valve 126 or relief valve 127 is opened to allow the hydraulic oil to flow through the other oil path to prevent the pressure from extraordinarily increasing. Further, if the amount of the hydraulic oil increases in the closed circuits, the hydraulic oil is supplied to a pilot side of flushing valve 128, to switch the flushing valve 128 so that the hydraulic oil is supplied in the direction of relief valve 129, and the surplus hydraulic oil is returned to the oil tank 131.

Although the hydraulic pump 70 sucks the hydraulic oil from the oil tank 131 and discharges it when the common axle 68 is turned, the hydraulic oil is supplied to the closed circuits formed respectively by the hydraulic pump 69 and hydraulic pump 71. When the hydraulic pump 70 is driven in one direction, the hydraulic pump 70 sucks the hydraulic oil from the oil tank 131 via the check valve 132, and discharges the hydraulic oil to the discharge side of the hydraulic pump 69 via the check valve 134 and also supplied to the discharge side of the hydraulic pump 71 via the check valve 138. If a pressure of the hydraulic oil discharged by the hydraulic pump 70 becomes extraordinarily high, the relief valve 137 is opened to return the hydraulic oil to the oil tank 131. On the other hand, when the common axle 68 is reversely returned, the direction of the hydraulic oil discharged by the hydraulic pump 70 is opposite to the forgoing direction. At this time, the hydraulic pump 70 sucks the hydraulic oil from the oil tank 131 via the check valve 133, and discharges the hydraulic oil to the discharge side of the hydraulic pump 69 (hydraulic output end opposite to the forgoing hydraulic output end) via the check valve 135, and also supplied to the discharge side (hydraulic output end opposite to the forgoing hydraulic output end) via the check valve 139. If the pressure of the hydraulic oil discharged by the hydraulic pump 70 becomes extraordinarily high, the relief valve 136 is opened to return the hydraulic oil to the oil tank 131. The oil supply circuit 119 operates, then the hydraulic pumps 69, 71 are operated so that the hydraulic oil from the hydraulic pump 70 is supplied to the closed circuits formed by the hydraulic pumps 69, 71 for preventing the closed circuits from being short of hydraulic oil, thereby always automatically supplying an appropriate amount of hydraulic oil to be circulated in the closed circuits.

SECOND EMBODIMENT

FIGS. 9 to 13

A driving mechanism of a track traveling vehicle according to a second embodiment of the invention is described now with reference to FIGS. 9 to 13.

Components of the driving mechanism of a track traveling vehicle of the second embodiment which are common to those of the first embodiment are identified by the same reference numerals and the explanation thereof is omitted. In the second embodiment, different from the first embodiment, hydraulic oil is discharged by the turning force of rear tires 14, 15 of the track traveling vehicle 10, and the thus discharged hydraulic oil drives front iron wheels 22 for allowing the track traveling vehicle 10 to travel on the track. Accordingly, the track traveling vehicle 10 employs the same construction as a general vehicle, namely a front wheel drive vehicle. The reason why such a construction is employed is that there is a case where a load is applied to the front iron wheels 22 depending on equipment to be placed or loaded on the track traveling vehicle 10, and in such a case, it is very efficient to drive the entire track traveling vehicle 10 by the front iron wheels 22.

Figure 9:
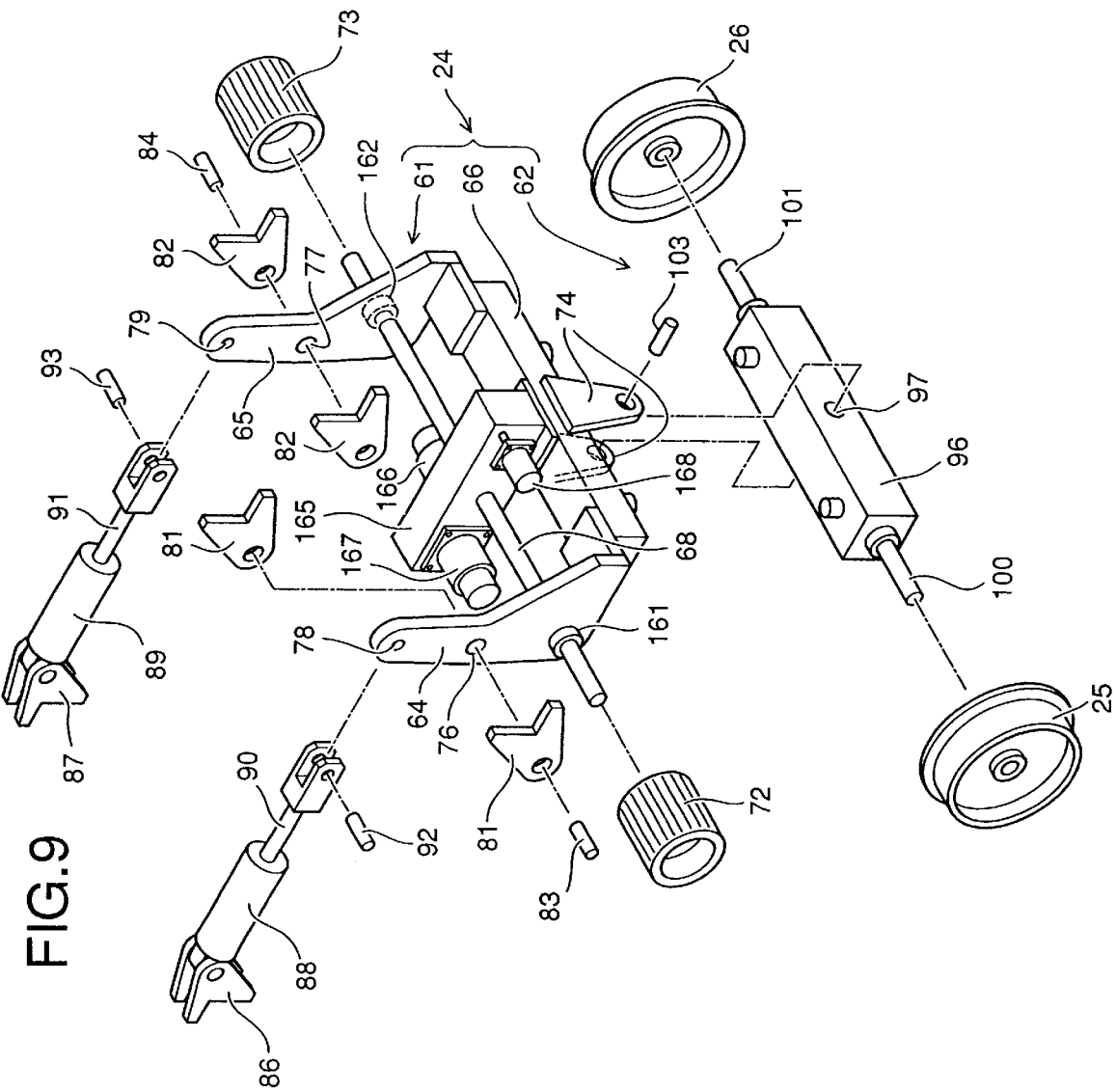
FIG. 9 is an exploded perspective view of disassembled parts of a mechanism fixed to the rear portion of a chassis for vertically moving rear iron wheels and generating a hydraulic pressure serving as a power transmitted from the rear tires to the rear iron wheels in a driving mechanism of a track traveling vehicle according to a second embodiment of the invention.

FIG. 9 shows a mechanism for generating a hydraulic pressure according to the second embodiment of the invention. FIG. 9 corresponds to FIG. 6, wherein components in FIG. 9 that are common to those in FIG. 6 are depicted by the same reference numerals. The forgoing end plates 64, 65 have respectively an L-shape, and bearings 161, 162 are respectively fixed to the corner portions of the L-shaped end plates 64, 65. A long common axle 68 is turnably supported by the bearings 161, 162 and both ends of the common axle 68 protrude to the left and right from the side surfaces of the end plates 64, 65. A friction wheel 72 is fixed to one end (left front side in FIG. 9) of the common axle 68 while a friction wheel 73 is fixed to the other end (right outermost side in FIG. 9) of the common axle 68. A long connecting body 66 is extended between the end plates 64, 65 at the lower sides thereof, thereby forming a swingable U-shaped frame or skeleton. A rectangular parallelepiped gear box 165 is fixed to the upper surface of the connection body 66 at the center thereof, and the entire gear box 165 is disposed to be directed in the front of the chassis 11 while the common axle 68 is turnably inserted into the side surface of the gear box 165 at substantially a central portion thereof.

The gear box 165 comprises a rectangular parallelepiped body that is hollow inside thereof and is formed of and surrounded by a thin steel plate at the periphery thereof, and a part of the gear box 165 at the lower surface is placed on and fixed to the upper surface of the connecting body 66. A plurality of gears, described later, are mounted in the gear box 165, wherein the driving force from the common axle 68 is transmitted to hydraulic pumps 166, 167, 168 when it is transmitted by the respective gears. The hydraulic pump 166 is fixed to one side surface (at the side of the end plate 65) of the gear box 165, and the hydraulic pumps 167, 168 are fixed to the other side surface (at the side of the end plate 64) of the gear box 165. When these hydraulic pumps 166, 167, 168 are operated, the friction wheels 72, 73, and the common axle 68 are respectively turned by the turning effort of rear tires 14, 15 so that the turning effort of the rear tires 14, 15 is converted into a force for discharging hydraulic oil.

A rectangular parallelepiped axle supporting portion 96 is laterally swingably connected to the lower surface of the connecting body 66, and driving shafts 100, 101 protrude respectively from left and right side surfaces of the axle supporting portion 96. The rear iron wheel 25 is turnably supported by the driving shaft 100 while the rear iron wheel 26 is turnably supported by the driving shaft 101 so that the rear iron wheels 25, 26 are held by the driving shafts 100, 101 so as to idle. Accordingly, the rear iron wheel 25, 26 contact rails 28, 29, so that the chassis 11 travels on the rails 28, 29 but they do not drive the chassis 11.

Figure 10:
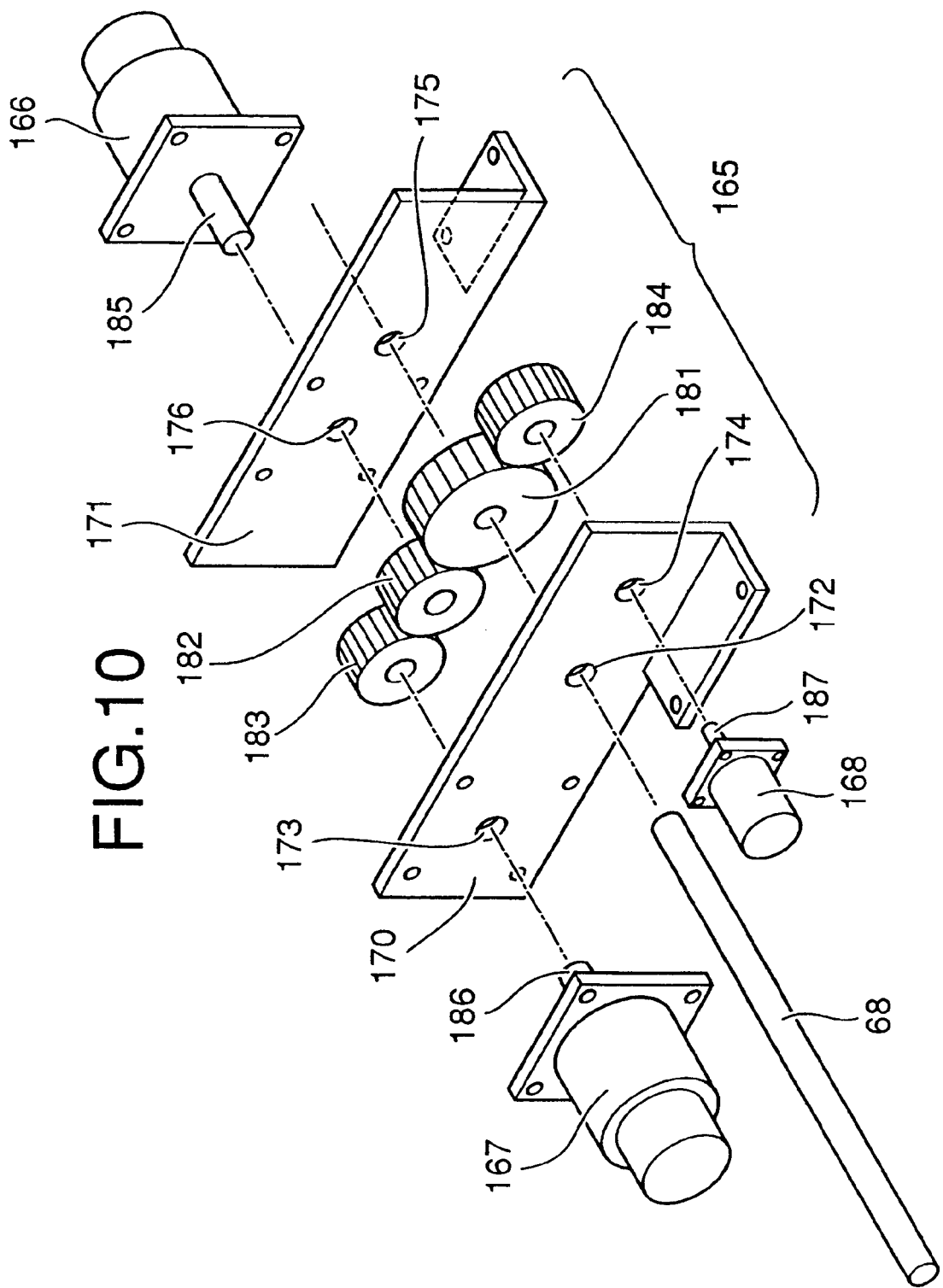
FIG. 10 is an exploded perspective view of a gear box for transmitting a turning effort from rear tires to hydraulic motors in the driving mechanism of a track traveling vehicle according to the second embodiment of the invention.

FIG. 10 shows an internal construction of the gear box 165. The gear box 165 is assembled by a thin steel plate at the upper and lower portions and a periphery thereof and is hermetically closed. In FIG. 10, only side plates 170, 171 respectively positioned at the left and right sides are illustrated, while side plates at the upper and lower sides, and side plates at the front and rear sides are removed. The side plate 170 is formed of a rectangular thin steel plate which stands upright, and one end thereof is bent outward at right angles to form a leg portion, and the leg portion is fixed to the upper surface of the connecting body 66. The side plate 170 is perforated to form an axle hole 172 at a substantially central portion thereof, a through hole 173 at the innermost side (left innermost side in FIG. 10) and another through hole 174 at the front side thereof. The side plate 171 is formed of a rectangular thin steel plate which stands upright, and one end thereof is bent outward at right angles to form a leg portion, and the leg portion is fixed to the upper surface of the connecting body 66. The side plate 171 is perforated to form an axle hole 175 at a substantially central portion thereof, and a through hole 176 at the front side thereof at a slightly innermost side.

The two side plates 170, 171 are arranged in parallel with each other while they are spaced apart, and a large gear 181, a middle gear 182 and small gears 183, 184 are respectively inserted between the side plates 170, 171. These gears mesh with one another, and they are arranged in a row in the order of the small gear 184, large gear 181, middle gear 182, small gear 183 in the direction from the right front side to the left innermost side in FIG. 10. The common axle 68 penetrates the axle hole 172, large gear 181 and axle hole 175 and it is turnably supported by the axle holes 172, 175, and the common axle 68 and the large gear 181 are connected to each other to be nonrotatably connected with each other. The hydraulic pump 166 is fixed to the side plate 171 at the outside thereof, and a pump shaft 185 protruded from the side surface of the hydraulic pump 166 is inserted into the through hole 176, and the middle gear 182 is fixed to the shaft 185. The hydraulic pump 167 is fixed to the side plate 170 at the outside and a pump shaft 186 protruded from the side surface of the hydraulic pump 167 is inserted into the through hole 173, and the small gear 183 is fixed to the shaft 186. Further, the hydraulic pump 168 is fixed to the side plate 170 at the outside thereof and a pump shaft 187 protruded from the side surface of the hydraulic pump 168 is inserted into the through hole 174, and the small gear 184 is fixed to the shaft 187. If the gear box 165 is assembled in such a manner, the large gear 181, middle gear 182, small gears 183, 184 are respectively turned while they are interlocked (i.e., meshed) with one another. Accordingly, if the common axle 68 is turned, the shafts 185, 186, 187 are driven at the same time via these gears.

Figure 11:
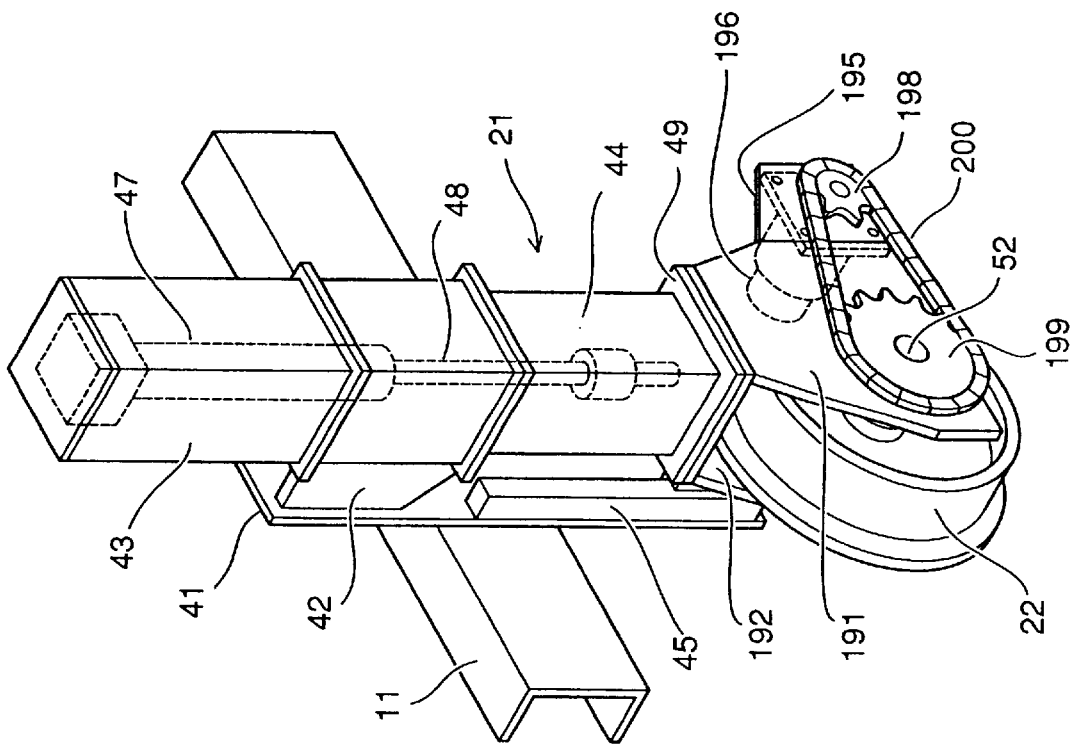
FIG. 11 is an enlarged perspective view of one of front jack mechanisms for vertically moving a front iron wheel of the track traveling vehicle according to the second embodiment of the invention as viewed from a slanting front side thereof.
Figure 12:
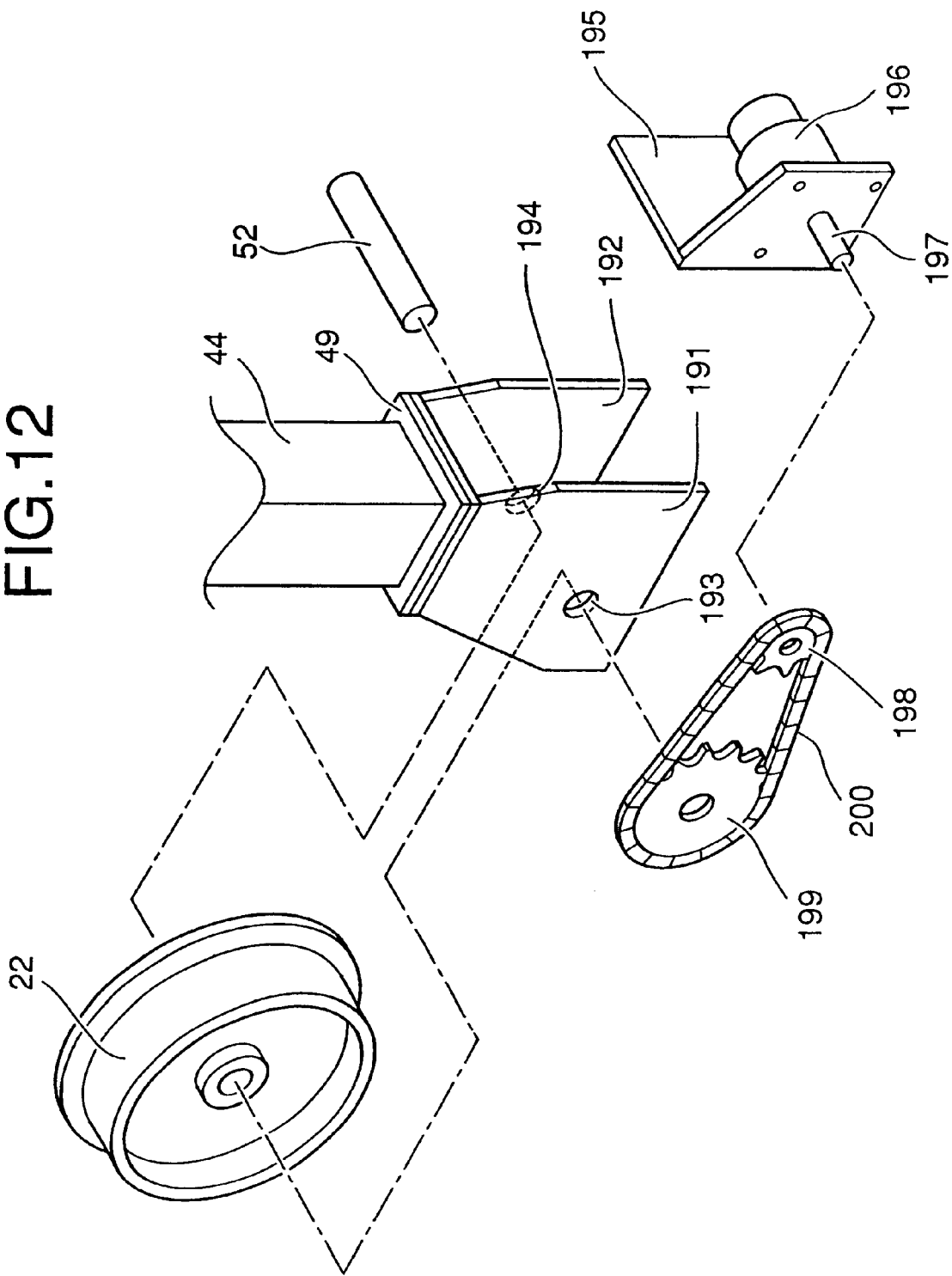
FIG. 12 is an exploded perspective view of a mechanism supported by one of the front jack mechanisms for driving the front iron wheel in the driving mechanism of a track traveling vehicle mechanism according to the second embodiment of the invention.

FIGS. 11 and 12 show the construction of each front jack mechanism 21 according to the second embodiment of the invention. Although the front jack mechanism 21 has the same mechanism as illustrated in FIGS. 4 and 5 for telescoping the inner tube 44, it has a mechanism built in the lower portion of the inner tube 44, different from the first embodiment, for driving the front iron wheel 22.

A square closing plate 49 is horizontally fixed to the lower end of the inner tube 44, and upper sides of flat plate shaped axle supporting plates 191, 192 are fixed to the lower surface of the closing plate 49 at the left and right ends (right front side and left innermost side in FIG. 11). Both axle supporting plates 191, 192 have a trapezoidal shape which is widened toward the lower direction as viewed from the side surfaces thereof, and they are arranged in parallel with each other while they are spaced, and they are assembled so as to form a U shape that is opened downward. As shown in FIG. 12, the side surface of the axle supporting plate 191 is perforated to form an axle hole 193 and the side surface of the axle supporting plate 192 is perforated to form an axle hole 194. The front iron wheel 22 is inserted into the space between the axle supporting plates 191, 192, and an axle shaft 52 is inserted into the axle hole 194, the central axis of the front iron wheel 22 and the axle hole 193 in this order, thereafter the front iron wheel 22 and the axle shaft 52 are fixed to each other. As a result, the front iron wheel 22 and the axle shaft 52 are integrated with each other so that the axle shaft 52 is turnably supported by the axle holes 193, 194.

A motor attachment plate 195 is fixed to the rear side portions of the axle supporting plates 191, 192. The motor attachment plate 195 is formed of a thin steel plate which is belt in an L shape, and it is fixed to the rear side portions of the axle supporting plates 191, 192 at both ends on flat surfaces thereof by welding or the like. The L-shaped bent portion of the motor attachment plate 195 is arranged in parallel with the flat surface of the axle supporting plate 191. A hydraulic motor 196 is fixed to the motor attachment plate 195, and a driving shaft 197 of the hydraulic motor 196 protrudes outward from the L-shaped bent flat surface of the motor attachment plate 195, wherein an axial line of the driving shaft 197 is arranged in parallel with that of the axle shaft 52. A large sprocket 199 is fixed to one end of the axle shaft 52 protruding from the axle supporting plate 191 and a small sprocket 198 is fixed to the driving shaft 197. An endless chain 200 is wound between the small sprocket 198 and large sprocket 199. With this construction, when the hydraulic motor 196 is driven, the driving shaft 197 is turned, and the turning effort of the driving shaft 197 is transmitted to the front iron wheel 22 via the small sprocket 198, endless chain 200, large sprocket 199 and axle shaft 52.

Figure 13:
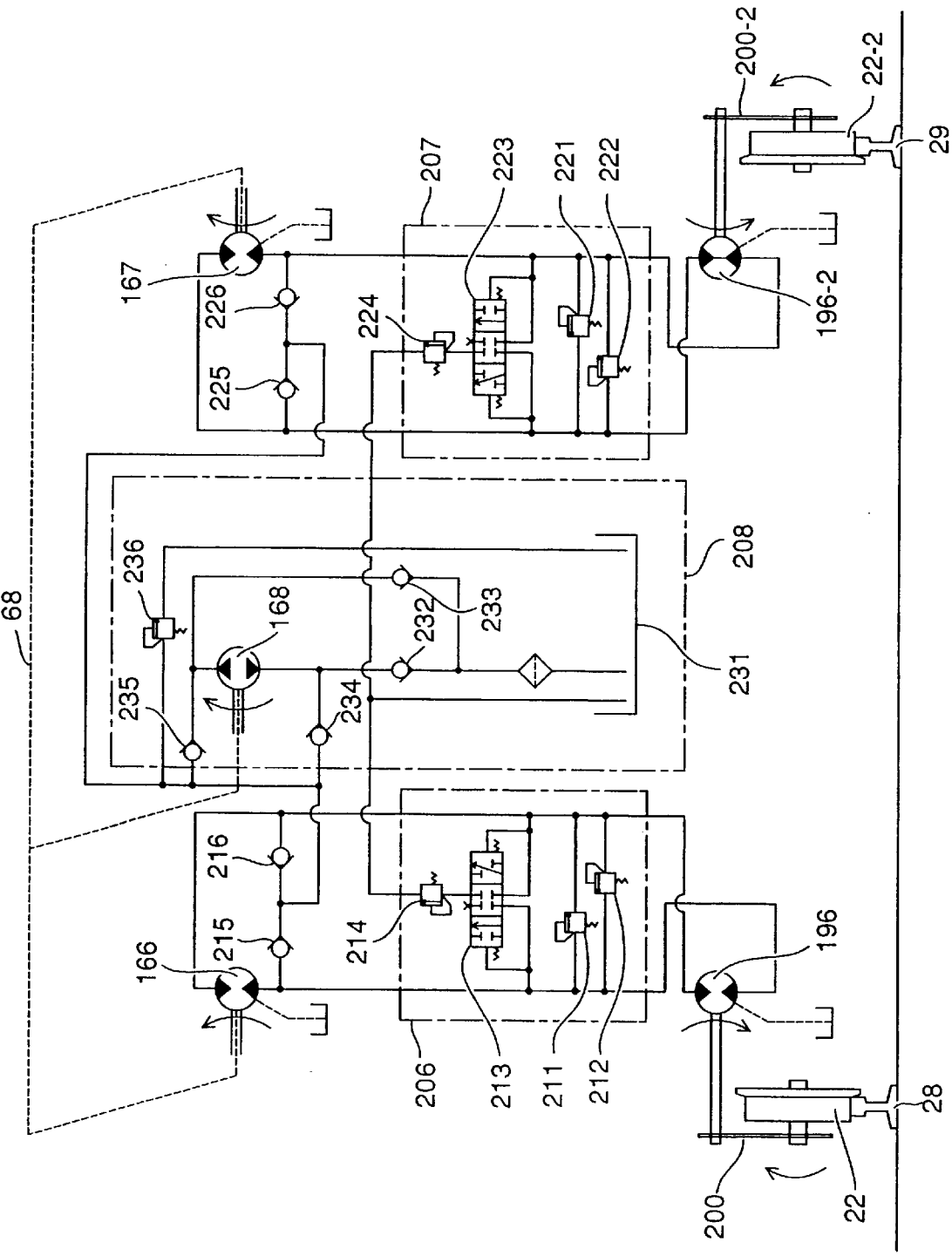
FIG. 13 is a hydraulic circuit showing generation of a hydraulic pressure and flow paths of a hydraulic oil for turning the front iron wheels in the driving mechanism of a track traveling vehicle according to the second embodiment of the invention.

FIG. 13 shows a construction of a hydraulic circuit of the hydraulic system in the driving mechanism of the track traveling vehicle 10 according to the second embodiment of the invention.

Both hydraulic input ends of the hydraulic motor 196 are connected to both hydraulic output ends of the hydraulic pump 166, wherein closed circulation circuits are formed by the hydraulic pump 166 and the hydraulic motor 196. A hydraulic oil discharged from the hydraulic pump 166 directly flows to the hydraulic motor 196, and the hydraulic motor 196 is operated while interlocked with the operation of the hydraulic pump 166. Likewise, both hydraulic input ends of a hydraulic motor 196-2 (although not shown in FIGS. 1 and 2, the same mechanism as the front jack mechanism 21 shown in FIGS. 11 and 12 is disposed on the opposite side of the track traveling vehicle 10. Although the other front jack mechanism 21 is not shown in FIGS. 11 and 12, there is provided the hydraulic motor 196-2 corresponding to the hydraulic motor 196, front iron wheel 22-2 corresponding to the front iron wheel 22, endless chain 200-2 corresponding to the endless chain 200) are connected to both hydraulic output ends of the hydraulic pump 167, wherein closed circulation circuits are formed by the hydraulic pump 167 and the hydraulic motor 196-2. A hydraulic oil discharged from the hydraulic pump 167 directly flows to the hydraulic motor 196-2, and the hydraulic motor 196-2 is operated while interlocked with the operation of the hydraulic pump 167.

A safety unit is built in the hydraulic circuit shown in FIG. 13 for preventing hydraulic equipment from being destroyed when hydraulic pressure inside the closed circuits becomes extraordinarily. First, a safety circuit 206 is interposed between the circulation circuits formed by the hydraulic pump 166 and hydraulic motor 196 while a safety circuit 207 is interposed between the circulation circuits formed by the hydraulic pump 167 and hydraulic motor hydraulic motor 196-2. The safety circuit 206 comprises relief valves 211, 212, 214 and a flushing valve 213. The relief valves 211, 212 are respectively interposed in a pair of oil paths connecting between both hydraulic output ends of the hydraulic pump 166 and hydraulic motor 196 so as to be opposite one another in operating direction, and they are connected to the neutral side of the flushing valve 213. Both hydraulic output ends of the hydraulic pump 166 are connected to control ports provided at both ends of the flushing valve 213. The relief valve 214 is connected to one of output ports of the flushing valve 213 at the neutral side, and it communicates with an oil tank 231.

The safety circuit 207 comprises relief valves 221, 222, 224 and a flushing valve 223. The relief valves 221, 222 are respectively interposed in a pair of oil paths connecting between both hydraulic output ends of the hydraulic pump 167 and hydraulic motor 196-2 so as to be opposite one another in operating directions, and they are connected to the neutral side of the flushing valve 223. Both hydraulic output ends of the hydraulic pump 167 are connected to control ports provided at both ends of the flushing valve 223. The relief valve 224 is connected to one of output ports of the flushing valve 223 at the neutral side, and it communicates with the oil tank 231.

An oil supply circuit 208 is formed separately from the pair of circulation circuits formed by the closed hydraulic pumps 166, 167. The oil supply circuit 208 is formed of the hydraulic pump 168 and can always supply hydraulic oil to the pair of circulation circuits, thereby preventing the circulation circuits from being short of hydraulic oil. A pair of check valves 215, 216 that are directed in backward direction are serially connected to both hydraulic output ends of the hydraulic pump 166 while a pair of check valves 225, 226 that are directed in backward direction are serially connected to both hydraulic output ends of the hydraulic pump 167. Each one end of check valves 232, 233 that are directed in forward direction is connected to both hydraulic output ends of the hydraulic pump hydraulic pump 168 while each one end of the check valves 232, 233 communicates with the oil tank 231. Each one end of check valves 234, 235 that are directed in forward direction is connected to both hydraulic output ends of the hydraulic pump 168 while each other end of the check valves 234, 235 is connected between the check valves 215, 216 and the check valves 225, 226. A relief valve 236 is connected to each other end of the check valves 234, 235 while a free or terminal end of the relief valve 236 is returned to the oil tank 231.

The operation of the driving mechanism of the track traveling vehicle according to the second embodiment of the invention is briefly described hereinafter.

When the track traveling vehicle 10 is forced to travel on the rails 28, 29, the hydraulic cylinders 88, 89 are operated to extend the cylinder rods 90, 91. Then, the end plates 64, 65 are turned clockwise about the pins 83, 84 in FIG. 9, so that the friction wheel 72 contacts the outer periphery of the left rear tire 14 while the friction wheel 73 contacts the outer periphery of the right rear tire 15. If an engine and a transmission respectively housed inside the track traveling vehicle 10 are operated in this state to drive the rear tires 14, 15, the turning effort thereof turns the friction wheels 72, 73. When the friction wheels 72, 73 are turned, the common axle 68 is also turned so that the turning effort of the common axle 68 is converted into a force for discharging hydraulic oil so as to generate a motive power for moving the track traveling vehicle 10 on the rails 28, 29

When the common axle 68 is turned, the common axle 68 is turned in the axle holes 172, 175 to drive the large gear 181 in FIG. 10. When the large gear 181 is turned, the middle gear 182 and small gear 184 respectively meshing with the large gear 181 are driven to turn the middle gear 182 and small gear 184 in the direction opposite to the large gear 181. At the same time, since the small gear 183 meshes with the middle gear 182, it is turned in the same direction as the common axle 68. When the middle gear 182 and small gears 183, 184 are turned, the shafts 185, 186, 187 are turned so that the respective hydraulic pumps 166, 167,168 are operated to discharge hydraulic oil. As shown in FIG. 13, since the hydraulic motor 196 is connected to both hydraulic output ends of the hydraulic pump 166, the discharged hydraulic oil flows in the circulation circuits and is supplied to the hydraulic motor 196 so that the hydraulic motor 196 is driven. When the hydraulic motor 196 is driven, the driving shaft 197 of the hydraulic motor 196 is turned as shown in FIG. 12 so that the turning effort of the driving shaft 197 is transmitted to the small sprocket 198, endless chain 200, large sprocket 199 and axle shaft 52 in this order, thereby turning the front iron wheel 22. Since the front iron wheel 22 contacts the rail 28, it is turned by the hydraulic motor 196 so that the track traveling vehicle 10 travels on the track.

Likewise, when the hydraulic pump 167 is operated to discharge hydraulic oil, the hydraulic oil flows in the closed circulation circuits formed by the hydraulic pump 167 and hydraulic motor 196-2 as shown in FIG. 13 so that the hydraulic oil is supplied to the hydraulic motor 196-2. The hydraulic motor 196-2 is driven by the hydraulic oil and the turning effort of the hydraulic motor 196-2 turns the front iron wheel 22-2. Since the front iron wheels 22-2 contacts the rail 29, the track traveling vehicle 10 travels on the track when the front iron wheel 22-2 is turned.

If the pressure of the hydraulic oil which flows in the circulation circuits becomes high while the hydraulic pumps 166, 167 are operated, the pressure is automatically forced to escape by the safety circuits 206, 207, thereby preventing equipment from being damaged. In the circulation circuits formed by the hydraulic pump 166 and hydraulic motor 196, if pressure in either flow path of the circulated circuits exceeds a prescribed value, either the relief valve 211 or 212 is operated so as to let hydraulic oil escape from an oil path having a high pressure to an oil path having a low pressure. If the amount of hydraulic oil inside the circulation circuit increases, a pressure is applied from either oil path to a pilot port so that the hydraulic oil is returned from the oil path having a high pressure to the oil tank 231 via the relief valve 214 while the flushing valve 213 is switched. Likewise, in the circulation circuits formed by the hydraulic pump 167 and hydraulic motor 196-2, if a pressure in either circulated circuit exceeds a prescribed value, either the relief valve 221 or relief valve 222 is operated so as to allow hydraulic oil to escape from an oil path having a high pressure to an oil path having a low pressure. If the amount of hydraulic oil inside the circulation circuits increases, a pressure is applied from either oil path to a pilot port so that the hydraulic oil can be returned from the oil path having a high pressure to the oil tank 231 via the relief valve 224 while the flushing valve 223 is switched.

In the hydraulic circuit shown in FIG. 13, the oil supply circuit 208 is provided for automatically supplying hydraulic oil to the two circulation circuits so as to prevent each circulation circuit from being short of hydraulic oil. When the hydraulic pump 168 is driven by the turning effort of the common axle 68, hydraulic oil discharged from the hydraulic pump 168 is always supplied to the two closed circulation circuits. That is, when the hydraulic pump 168 is driven, the hydraulic oil stored in the oil tank 231 passes through either the check valve 232 or check valve 233, then it is sucked. The hydraulic oil that is discharged from either end of the hydraulic output ends of the hydraulic pump 168 passes through either the check valve 234 or check valve 235 and flows into the two circulation circuits. The hydraulic oil that flows out from either the check valve 234 or check valve 235 passes through either the check valve 215 or check valve 216, and it is supplied to the suction side of the hydraulic pump 166. Likewise, the hydraulic oil that flows out from either the check valve 234 or check valve 235 passes through either the check valve 225 or check valve 226, and it is supplied to the suction side of the hydraulic pump 167. As a result, the hydraulic oil is always supplied to the circulation circuits formed by the hydraulic pump 166 and the hydraulic motor 196 and the circulation circuits formed by the hydraulic pump 167 and hydraulic motor 196-2.

The relief valve 236 is operated to prevent the hydraulic oil supplied from the oil supply circuit 208 from being excessively supplied to the two circulation circuits. As mentioned above, although the hydraulic oil discharged from the hydraulic pump 168 flows out from either the check valve 234 or check valve 235, the relief valve 236 is released or opened when a pressure of the hydraulic oil at the position where the hydraulic oil flows out becomes high so as to reduce the pressure of the hydraulic oil by returning the hydraulic oil to the oil tank 231. The construction of the hydraulic circuit according to the second embodiment of the invention shown in FIG. 13 is more simplified compared with that of the first embodiment of the invention so that an appropriate amount of hydraulic oil is always supplied to the hydraulic circuits when the hydraulic pump 168 is operated at the same time with the hydraulic pumps 166, 167.

Since the driving mechanism of a track traveling vehicle of the invention has been constructed as set forth above, it is possible to operate the hydraulic pumps by the turning effort of the rubber tires for driving use, and the hydraulic oil discharged from the hydraulic pumps operate the hydraulic motors for turning the iron wheels so that the construction of the driving mechanism of a track traveling vehicle is simplified. It is not necessary to mount hydraulic pumps directly connected to an engine of a vehicle on a chassis, as has been done conventionally in track traveling vehicles, thereby dispensing with a process or step to mount the hydraulic pumps on the chassis so that the driving mechanism of the track traveling vehicle can be easily assembled. Further, with the hydraulic pumps directly connected to an engine, it was necessary to employ expensive variable discharge amount hydraulic pumps because the discharging amount of hydraulic oil must be controlled by stages. According to the invention, it is possible to discharge hydraulic oil by inexpensive fixed discharge amount hydraulic pumps so as to turn the iron wheels, thereby allowing the track traveling vehicle to travel on the track. An rpm of the iron wheels, namely, a velocity of the track traveling vehicle can be controlled by an rpm of the rubber tires so that the velocity of the track traveling vehicle travelling on the track can be controlled in the same operating manner as a conventional truck so that the track traveling vehicle can be easily operated.

Since the driving mechanism has a skeleton construction comprising the swing portion swingably fixed to the chassis, and the friction wheels are supported by the swing portion, the friction wheels can be selectively forced to contact or move away from the rubber tires when the swing portion is operated by the hydraulic cylinders. When the friction wheels are brought into contact with the rubber tires, the friction wheels are driven to operate the hydraulic pumps connected to the friction wheels so that the hydraulic oil can be discharged. When the swing portion is turned, the discharge of the hydraulic oil in the track traveling vehicle 10 can be switched, thereby facilitating the operation. Since the driving mechanism can be assembled as a single unit, if the driving mechanism as a unit is connected to the chassis, a vehicle such as a truck can be reformed to form the track traveling vehicle. The reforming of the vehicle can be easily and quickly made by merely attaching a unit to the vehicle without reforming the body of the vehicle to a large extent. Further, since piping through which hydraulic oil flows can be drawn or turned around within the area of the unit, piping need not be drawn or turned around for a long distance extending from the chassis to the hydraulic motors for driving the rear iron wheels.

Further, since the axle supporting portion for supporting the rear iron wheels is provided under the swing portion of the driving mechanism in parallel therewith, when the swing portion is driven by the hydraulic cylinders, the rear iron wheels can be pressed downward against the rails. This operation is performed at the same time when the swing portion is turned to allow the friction wheels to contact the rear rubber tires. Accordingly, it is possible to simultaneously perform the function to allow the friction wheels to contact the rear rubber tires and the function to press down the rear iron wheels against the rails so that the rear rubber tires are forced to float in the air, and the travelling on the track and that on a public road can be swithed when the swing portion is turned so that the switching operation can be easily made.

The driving mechanism comprises the swing portion and the axle supporting portion, and wherein the axle supporting portion can be swung laterally relative to the swing portion. Since the rear iron wheels are supported by the axle supporting portion at the left and right thereof, the rear iron wheels can be moved vertically when the swing portion swings so that both rear iron wheels are forced to contact the rails even if the rails have a distortion or difference in height. In such a manner, the distortion in the rails or play in the wheel axle can be adjusted so that the rear iron wheels always contact the rails. Accordingly, the turning effort of the rear iron wheels can be accurately transmitted to the rails so that the track traveling vehicle can travels on the rails with assurance.

The hydraulic output ends of the hydraulic pumps for driving use and those of the hydraulic motors are connected to each other to form the closed hydraulic circulation circuits. In the friction wheels, the hydraulic pump for oil supply use is operated separately from the hydraulic pumps for driving use, and they are connected to each other in a manner that hydraulic oil discharged from the hydraulic pump for oil supply use is supplied to the closed hydraulic circulation circuits. Even in the closed circulation circuits, if they are used for a long period of time, there is a possibility that hydraulic oil leaks to lower the pressure of the hydraulic oil. When hydraulic oil is supplied from the hydraulic pump for oil supply use to the closed circulation circuits, the closed circulation circuits are adjusted to keep hydraulic oil necessary for the operation. Further, since the hydraulic pump for oil supply use is driven at the same time with the hydraulic pumps for driving, there does not occur a case of a shortage of hydraulic oil.

There are two hydraulic pumps for driving use and two hydraulic motors in the driving mechanism and they are combined with each other to form two closed hydraulic circulation circuits. Each hydraulic motor can drive each rear iron wheel independently so as to absorb the difference in turning between the rear iron wheels and transmit a turning force onto the rails with assurance, thereby allowing the track traveling vehicle to travel on the rails. A hydraulic oil discharged from the hydraulic pump for oil supply use is supplied to the circulation circuits to prevent each circulation circuit from being short of hydraulic oil. Accordingly, it is possible to prevent the hydraulic motors for driving the rear iron wheels from idling so that the rear iron wheels can always be driven by the hydraulic oil discharged from the hydraulic pumps for driving use.

The hydraulic output ends of the hydraulic pumps for driving use and those of the hydraulic motors are connected to each other to form the closed hydraulic circulation circuits, and a safety circuit is provided in the oil paths between pressure application sides and application collection sides of the hydraulic circulation circuits for allowing hydraulic oil of one hydraulic circulation circuit to flow to the other hydraulic circulation when a hydraulic oil exceeds a prescribed value. Accordingly, if the rear iron wheels are not turned due to some causes or a pressure of a hydraulic oil in the oil paths becomes extraordinary high, the pressure is forced to escape to the other oil path so as to stop the operation of the hydraulic pumps and hydraulic motors to prevent them from burning out.

The hydraulic pumps for driving use and the hydraulic pump for oil supply use are driven by the friction wheels at the same time, and they are connected to each other in a manner that hydraulic oil discharged from the hydraulic pump for oil supply use is supplied to the closed hydraulic circulation circuits formed by the hydraulic pumps for driving use and hydraulic pump for oil supply use. Check valves that are directed in a forward direction relative to the hydraulic pump for oil supply use are interposed between both hydraulic output ends of the hydraulic pump for oil supply use, and relief valves are also connected to the same both hydraulic output ends, wherein the check valves and relief valves communicate with an oil tank respectively. Further, the hydraulic output ends of the hydraulic pump for oil supply use and those of the hydraulic pumps for driving use are mutualy connected to each other via the check valves, wherein the check valves are directed toward the hydraulic pumps for driving use. With this construction, hydraulic oil is sucked from the oil tank through the check valves directed in the forward direction and is supplied to the hydraulic pumps for driving use through the check valve directed in the forward direction. Although the hydraulic pump for oil supply use is operated at the same time with the hydraulic pumps for driving use so that the hydraulic pump for oil supply use discharges hydraulic oil in the normal or reverse turning, the hydraulic output end at the discharge side is reversed. However, since the check valves are interposed at the suction side and discharge side of the hydraulic pump for oil supply use, hydraulic oil discharged from the hydraulic pump for oil supply use is always supplied to the discharge sides of the hydraulic pumps for driving use. Accordingly, hydraulic oil discharged from the hydraulic pump for oil supply use is supplied to the oil path at the pressure application side of the hydraulic circulation circuits formed by the hydraulic pumps for driving use and the hydraulic motors irrespective of the normal and reverse tuning of the friction wheels so that the circulation circuits are prevented from being short of hydraulic oil.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A driving mechanism of a track traveling vehicle capable of traveling on both a road and a track, comprising:

front and rear rubber road tires supported by a chassis at a lower portion thereof;

front and rear metal track wheels supported by the chassis and movable vertically relative to the chassis;

hydraulic pumps and hydraulic motors;

the track traveling vehicle traveling on the road when the track wheels are lifted and the front and rear road tires are forced to contact the road, and the track traveling vehicle traveling on the track when the front and rear track wheels are lowered to contact rails while the front and rear road tires are raised upwardly in the air; and the hydraulic pumps being driven by the rear road tires when they are raised upwardly in the air so as to suck and discharge hydraulic oil to the hydraulic motors, and the front or rear track wheels being driven by the hydraulic motors so that the track traveling vehicle travels on the track.

2. The driving mechanism of a track traveling vehicle according to claim 1, wherein a swing portion is mounted to the chassis and arranged to be vertically swung by hydraulic cylinders, friction wheels supported by the swing portion and capable of contacting the rear road tires at the peripheries thereof when the swing portion is turned, and the hydraulic pumps being driven when the friction wheels are turned by the rear road tires.

3. The driving mechanism of a track traveling vehicle according to claim 1, wherein a swing portion is mounted to the chassis and arranged to be vertically swung by hydraulic cylinders, an axle supporting portion mounted to the swing portion at the lower portion thereof, the rear track wheels supported by the axle supporting portion at both sides thereof, and the hydraulic motors provided on the axle supporting portion for driving the rear track wheels, wherein the swing portion and the axle supporting portion are turned when the hydraulic cylinders are operated so that the rear track wheels supported by the axle supporting portion are forced to contact rails to allow the road tires to be raised in the air.

4. The driving mechanism of a track traveling vehicle according to claim 1, wherein a swing portion is mounted to the chassis and arranged to be vertically swung by hydraulic cylinders, and an axle supporting portion mounted to the swing portion at the lower portion thereof, wherein the axle supporting portion is connected to the swing portion so as to be laterally vertically swung.

5. The driving mechanism of a track traveling vehicle according to claim 1, wherein the hydraulic motors are drivingly coupled to the rear track wheels to effect driving of the vehicle along the track.

6. The driving mechanism of a track traveling vehicle according to claim 1, wherein the hydraulic motors are drivingly coupled to the front track wheels to effect driving of the vehicle along the track.

7. A driving mechanism of a track traveling vehicle capable of traveling on both a road and a track, comprising:

front and rear rubber road tires supported by a chassis at a lower portion thereof;

front and rear metal track wheels supported by the chassis and movable vertically relative to the chassis;

the track traveling vehicle traveling on the road when the track wheels are lifted while the front and rear road tires are forced to contact the road, and the track traveling vehicle traveling on the track when the front and rear track wheels are lowered to contact rails while the front and rear road tires are forced to be raised in the air; and said driving mechanism further comprising hydraulic pumps for driving use that are driven when the rear road tires are turned, hydraulic motors that are driven by hydraulic oil discharged by the hydraulic pumps for driving use, and a hydraulic motor for oil supply use that is driven when the rear road tires are turned, wherein two hydraulic circulation circuits are formed by connecting and closing both hydraulic output ends of the hydraulic pumps for driving use and the hydraulic motors; and wherein a hydraulic output end of the hydraulic pump for oil supply use at the discharge side communicates with the hydraulic circulation circuits, so that the two hydraulic pumps are driven at the same time when the rear road tires are turned to discharge the hydraulic oil, thereby supplying hydraulic oil that is discharged from the hydraulic pump for oil supply use to the hydraulic oil circulation circuits.

8. The driving mechanism of a track traveling vehicle according to claim 7, wherein the number of said hydraulic pumps for driving use is two, and the number of said hydraulic motors for turning the rear track wheels is two, and the number of said hydraulic pump for oil supply use is one, wherein the three hydraulic pumps are operated at the same time when the rear road tires are turned, and wherein the hydraulic pumps for driving use are connected to both hydraulic output ends of the hydraulic motors to form two hydraulic circulation circuits, the hydraulic output end of the hydraulic pump for oil supply use at the discharge side communicates with the hydraulic circulation circuits, and wherein hydraulic oil discharged from the hydraulic pump for oil supply use is supplied to the respective independent hydraulic circulation circuits for turning the hydraulic motors.

9. The driving mechanism of a track traveling vehicle according to claim 8, wherein the hydraulic circulation circuits are formed by connecting and closing both hydraulic output ends of the hydraulic pumps for driving use and hydraulic motors for turning the rear track wheels, and a safety circuit is provided between pressure application sides and application collection sides of the hydraulic circulation circuits for leaking hydraulic oil of one hydraulic circulation circuit to the other hydraulic circulation circuit and discharging overflowed hydraulic oil when a hydraulic oil exceeds a prescribed value.

10. The driving mechanism of a track traveling vehicle according to claim 8, wherein both hydraulic output ends of the hydraulic pump for oil supply use communicates with an oil tank via check valves directed in a forward direction, and also communicates with the oil tank via relief valves directed in a forward direction, and further connected to both hydraulic output ends of the hydraulic pumps for driving use via check valves directed in a forward direction.

11. The driving mechanism of a track traveling vehicle according to claim 7, wherein the hydraulic circulation circuits are formed by connecting and closing both hydraulic output ends of the hydraulic pumps for driving use and hydraulic motors for turning the rear track wheels, and a safety circuit is provided between pressure application sides and application collection sides of the hydraulic circulation circuits for leaking hydraulic oil of one hydraulic circulation circuit to the other hydraulic circulation circuit and discharging overflowed hydraulic oil when a hydraulic oil exceeds a prescribed value.

12. The driving mechanism of a track traveling vehicle according to claim 7, wherein both hydraulic output ends of the hydraulic pump for oil supply use communicates with an oil tank via check valves directed in a forward direction, and also communicates with the oil tank via relief valves directed in a forward direction, and further connected to both hydraulic output ends of the hydraulic pumps for driving use via check valves directed in a forward direction.

* * * * *